United States Patent
Karangutkar et al.

(10) Patent No.: US 12,212,554 B2
(45) Date of Patent: *Jan. 28, 2025

(54) TENANT-AWARE DISTRIBUTED APPLICATION AUTHENTICATION

(71) Applicant: Illumina, Inc., San Diego, CA (US)

(72) Inventors: Milan Karangutkar, Santa Clara, CA (US); Prabhu Palanisamy, Cupertino, CA (US); Satnam Alag, Santa Clara, CA (US)

(73) Assignee: Illumina, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,382

(22) Filed: May 22, 2023

(65) Prior Publication Data

US 2023/0379316 A1 Nov. 23, 2023

Related U.S. Application Data

(63) Continuation of application No. 16/989,730, filed on Aug. 10, 2020, now Pat. No. 11,683,300, which is a
(Continued)

(51) Int. Cl.
*H04L 9/40* (2022.01)
*G06F 21/41* (2013.01)
(Continued)

(52) U.S. Cl.
CPC .......... *H04L 63/0815* (2013.01); *G06F 21/41* (2013.01); *H04L 63/102* (2013.01); *H04W 12/06* (2013.01); *H04W 12/062* (2021.01)

(58) Field of Classification Search
CPC ... H04L 63/0815; H04L 63/102; G06F 21/41; H04W 12/06; H04W 12/062
See application file for complete search history.

(56) References Cited

U.S. PATENT DOCUMENTS 8,886,817 B2   11/2014   Ting et al.
9,065,819 B1 *  6/2015   Shanmugam ........... G06F 21/41
(Continued)

FOREIGN PATENT DOCUMENTS

CN   103188248   7/2013
CN   103930897   7/2014
(Continued)

OTHER PUBLICATIONS

"Single sign-on," *Wikipedia*, wikipedia.com, visited May 5, 2016, 5 pages.
(Continued)

*Primary Examiner* — Beemnet W Dada
(74) *Attorney, Agent, or Firm* — Klarquist Sparkman, LLP

(57) ABSTRACT

Flexible authentication technologies customized to particular tenants of a data center network can be implemented. For example, an administrator can specify a primary authentication server and specify at which data centers different applications are to be hosted for a given tenant. End users can be shielded from the complexities of implementing such configuration details. For example, single sign-on authentication can be implemented, even when applications are configured to be hosted in different data centers. Enterprise tenants can thus control where applications are hosted and enforce data containment scenarios without encumbering users with additional tasks. Collaboration and application-to-application authentication can be achieved.

20 Claims, 12 Drawing Sheets

Related U.S. Application Data continuation of application No. 15/614,325, filed on Jun. 5, 2017, now Pat. No. 10,771,447.

(60) Provisional application No. 62/346,367, filed on Jun. 6, 2016.

(51) Int. Cl.
  *H04W 12/06*  (2021.01)
  *H04W 12/062*  (2021.01)

(56) References Cited

U.S. PATENT DOCUMENTS

| | | | |
|---|---|---|---|
| 9,276,938 | B2 | 3/2016 | Raizada |
| 9,286,491 | B2 | 3/2016 | Roth et al. |
| 9,288,184 | B1 | 3/2016 | Kvamme et al. |
| 10,771,447 | B2 | 9/2020 | Karangutkar et al. |
| 2008/0022003 | A1 | 1/2008 | Alve |
| 2009/0106823 | A1 | 4/2009 | Durski |
| 2012/0254111 | A1 | 10/2012 | Carmichael |
| 2012/0254116 | A1 | 10/2012 | Thereska et al. |
| 2013/0024429 | A1 | 1/2013 | Raas |
| 2013/0091171 | A1 | 4/2013 | Lee |
| 2014/0188804 | A1 | 7/2014 | Gokhale et al. |
| 2014/0280939 | A1 | 9/2014 | Banatwala et al. |
| 2015/0019858 | A1 | 1/2015 | Roth et al. |
| 2015/0149766 | A1 | 5/2015 | Shukla et al. |
| 2016/0134619 | A1 | 5/2016 | Mikheev et al. |
| 2017/0353444 | A1 | 12/2017 | Karangutkar et al. |
| 2018/0167378 | A1 | 6/2018 | Kostyukov et al. |

FOREIGN PATENT DOCUMENTS

| | | |
|---|---|---|
| CN | 104410604 | 3/2015 |
| CN | 105592003 | 5/2016 |
| EP | 2587759 | 5/2013 |

OTHER PUBLICATIONS

"Claims-Based Architectures," Microsoft Developer Network, msdn.microsoft.com, visited May 5, 2016, 26 pages.
"Identity provider," *Wikipedia*, en.wikipedia.org, visited May 11, 2016, 2 pages.
Ritchie, "Global Security Challenges," *SC Magazine*, scmagazine.com, Apr. 2, 2008, 7 pages.
Jones et al., "The OAuth Authorization Framework: Bearer Token Usage," Internet Engineering Task Force, Request for Comments: 6750, ISSN: 2070-1721, Oct. 2002, 18 pages.
"OAuth," *Wikipedia*, en.wikipedia.org, visited May 20, 2016, 7 pages.
Miah,"What are Bearer Tokens and token_type in OAuth?" stackoverflow.com, May 8, 2011, 2 pages.
"Security Assertion Markup Language," *Wikipedia*, en.wikipedia.org, visited May 20, 2016, 6 pages.
Ormond, "Microsoft cloud services and network security," azure.microsoft.com, Microsoft Corporation, Mar. 14, 2016, 36 pages.
International Search Report for PCT/US2017/035982, mailed Jul. 31, 2017, 4 pages.
Written Opinion for PCT/US2017/035982, mailed Jul. 31, 2017, 6 pages.
First Examination Report, counterpart Australian Application No. 2017278239, dated Jun. 6, 2019, 3 pages.
Office Action received in counterpart Canada Patent Application No. 3,025,198, dated Oct. 21, 2019, 4 pages.
Examination Report of counterpart European Application No. 17731676.7, Jul. 10, 2020, 4 pages.
Office Action and translation received in a Chinese counterpart application No. 201780043094.2, Sep. 28, 2020, 23 pages.
Second Office Action received in counterpart Chinese Patent Application No. 201780043094.2, with English translation May 14, 2021, 11 pages.
Patil et al., "Implementation of Security Framework for Multiple Web Applications," 2014 International Conference on Computer Communication and Informatics (ICCI-2014), Jan. 3-5, 2014, Coimbatore, India, 7 pages.
Zhang, "Research on Single Sign-on Technology Based on ADFS," China Master's Theses Full Text Database Information Technology Series, with English Abstract, Dec. 31, 2013, 70 pages.

\* cited by examiner

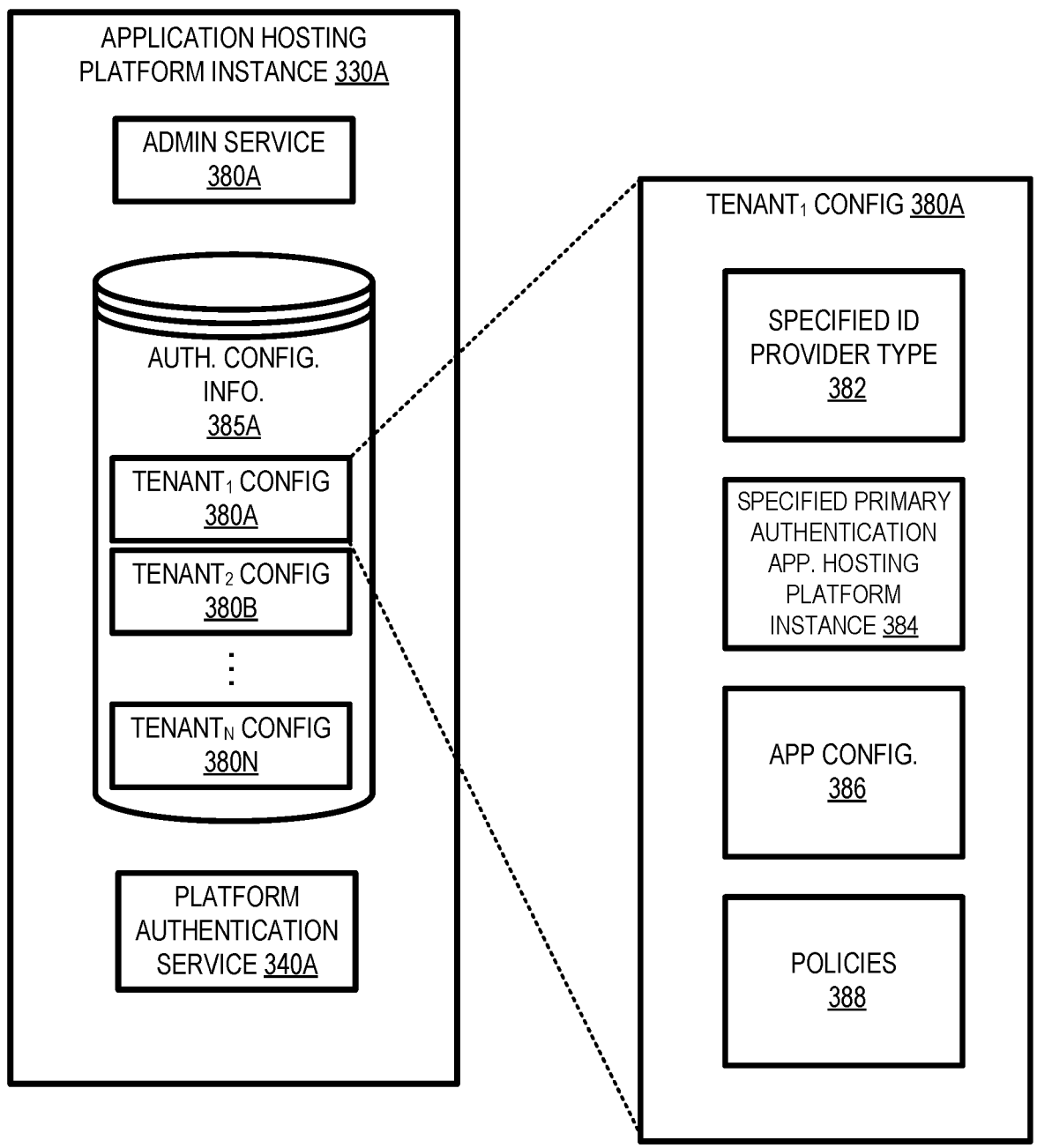
FIG. 3

TENANT-AWARE DISTRIBUTED APPLICATION AUTHENTICATION

CROSS REFERENCE TO RELATED APPLICATION

This application is a continuation of U.S. patent application Ser. No. 16/989,730, filed Aug. 10, 2020, which is a continuation of U.S. patent application Ser. No. 15/614,325, filed Jun. 5, 2017, now U.S. Pat. No. 10,771,447, which claims the benefit of U.S. Provisional Application No. 62/346,367, filed on Jun. 6, 2016, all of which are hereby incorporated herein by reference.

BACKGROUND

Computing service providers face a balancing act between providing uniform, user-friendly computing platforms and granting customers control and customizability over such platforms. For example, incorporating specialized features into a platform may be helpful for one set of applications, but may add complexity for others. A particularly challenging area is network security.

Further, even as collaboration within and among enterprises becomes the norm, one enterprise may migrate toward certain technologies, while another enterprise migrates to others. Thus, computing service providers are challenged to both satisfy their customers and provide a uniform platform. There are systems for accommodating such scenarios, but limitations arise in real-world enterprise computing scenarios, particularly in the technical field of network security.

There is therefore room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In one embodiment, a computer-implemented method of authenticating clients accessing a cluster of a plurality of application hosting platform instances comprises, from a client authenticated to access a first application hosted on a first application hosting platform instance of the cluster via an authentication token, receiving, at a second instance of the application hosting platform, a request to access a second application hosted on the second application hosting platform instance of the cluster; responsive to the request, fetching the authentication token from the client to the second instance of the application hosting platform; determining one of the application hosting platform instances of the cluster as being a primary authentication application hosting platform instance; sending a validation request for the authentication token to the primary authentication application hosting platform instance; receiving validation confirmation of the authentication token from the primary authentication application hosting platform instance; and responsive to receiving validation confirmation, granting access to the second application hosted on the second application hosting platform instance to the client.

In another embodiment, a computing system comprises one or more processors; memory; a plurality of application hosting platform instances comprising respective platform authentication services configured to store and validate authentication tokens, one or more respective hosted applications, and tenant-specific authentication configuration information for a plurality of tenants; wherein the platform authentication services of the application hosting platform instances are configured serve as a primary platform authentication service according to the tenant-specific authentication configuration information of a given tenant of the tenants; and wherein the platform authentication services are configured to redirect authentication requests from the hosted applications for the given tenant to the primary platform authentication service specified for the given tenant in the tenant-specific authentication configuration information.

In another embodiment, one or more computer-readable media comprise computer-executable instructions that when executed cause a computing system to perform a method comprising: in a computing cluster spanning a plurality of data centers supporting a plurality of tenants, receiving, from a client authenticated to access a first application via a bearer authentication token granted by a primary platform authentication service as a result of authentication by an identity provider specified in confirmation information for a particular tenant out of the plurality of tenants, a request to access a second application; fetching the bearer authentication token from the client; determining a primary authentication application hosting platform instance for the client; sending an authentication request to the primary platform authentication service of the primary authentication application hosting platform instance for validation, wherein authentication request comprises the bearer authentication token, a tenant identifier of the particular tenant, an application instance identifier of the second application, and an application secret of the second application; receiving a communication from the primary platform authentication service indicating that the authentication request is valid; and responsive to receiving the communication that the authentication request is valid, granting access by the client to the second application; wherein the first application is hosted by a first instance of an application hosting platform executing at a first data center, and the second application is hosted by a second, different instance of the application hosting platform executing at a second, different data center.

As described herein, a variety of other features and advantages can be incorporated into the technologies as desired.

BRIEF DESCRIPTION OF THE DRAWINGS

FIG. 3 is a block diagram of an example system storing tenant-specific configuration information for implementing tenant-aware distributed application authentication.

DETAILED DESCRIPTION

Flexible authentication configuration can be specified for any of a plurality of tenants as described herein. Control over where applications are hosted can be achieved while also achieving such user functionality as single sign-on. Other features relating to identity providers and auditing can be employed to achieve the technologies as described herein.

As described herein, authentication for access to applications can be distributed among a plurality of application hosting platform instances (e.g., a platform cluster). The platform can be engineered to be tenant-aware in that different tenants can specify different primary platform instances, different preferred identity providers, different locations at which different applications are to be hosted, or the like. Such information can be received by the system as authentication configuration described herein.

Regardless of where an application is hosted, a request for access to the application can be validated against a primary platform authentication service, resulting in platform-location-independent authentication routing for applications.

If a client is already authenticated, an authentication token can be seamlessly fetched and validated against the primary platform authentication service, resulting in seamless single sign-on between heterogeneous application hosting locations. The primary authentication service can be specified in configuration information, resulting in per-tenant-configurable primary platform authentication service specification and a tenant-designated primary authentication platform instance (e.g., that hosts the primary platform authentication service).

Administrators can benefit from the technologies because centralized administration can be achieved instead of a hodgepodge of different systems, even when the different systems are in different data centers, different jurisdictions, or the like. Control over where applications are hosted can be maintained.

Users can benefit as well by avoiding errors and downtime that result from accumulated, burdensome administrative tasks. Further, users can seamlessly access a variety of applications across an array of data centers without having to be aware of such complexities. Computing and network resources can be reduced because multiple sign-on can be avoided as described herein.

Therefore, overall performance of authentication for access to applications can be enhanced as described herein.

Figure 1:
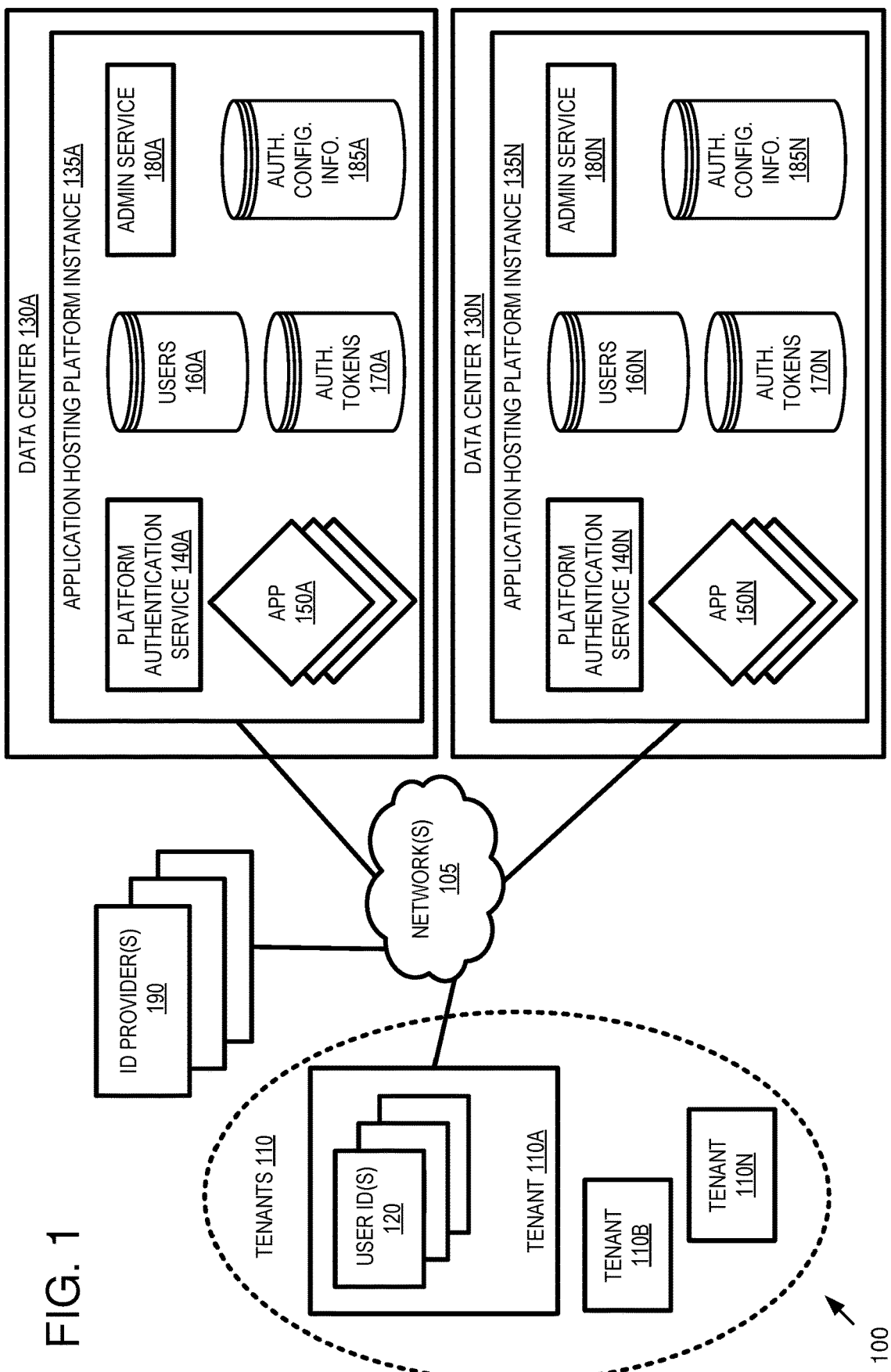
FIG. 1 is a block diagram of an example system implementing tenant-aware distributed application authentication.

Example 1—Example System Implementing Tenant-Aware Distributed Application Authentication FIG. 1 is a block diagram of an example system 100 implementing tenant-aware distributed application authentication.

In the example, a plurality of tenants 110A-N are associated with user identifiers 120 that access a plurality of application hosting platform instances 135A-N executing at respective data centers 130A-N via one or more networks 105.

As described herein, tenants 110A-N can avail themselves of any of a plurality of identity provider services 190 by specifying a preferred identity provider service in configuration information as described herein. Platform authentication services 140A-N can initially authenticate clients requesting access to applications 150A-N via an identity provider service 190 specified in tenant-specific configuration information. Platform authentication services can relay initial authentication requests to the identity provider service based on the tenant-specific configuration information. A plurality of different identity provider services can be supported.

Any of the application hosting platform instances 135A-N can comprise respective platform authentication services 140A-N, provisioned user records 160A-N, stored authentication token records 170A-N, administrative services 180A, and authentication configuration information 185A-N.

Thus, the plurality of application hosting platform instances 135A-N can comprise respective platform authentication services 140A-N, which are configured to store and validate authentication tokens (e.g., stored as authentication token records 170A-N). The instances can also comprise respective hosted applications 150A-N and authentication configuration information 185A-N for a plurality of tenants (e.g., 110A-N).

A preferred one of the platform authentication services 140A-N of the application hosting platform instances 135A-N can be configured to serve as a primary platform authentication service according to tenant-specific configuration information 185A-N of a given tenant of the tenants 110A-N.

The platform authentication services 140A-N are configured to redirect authentication requests from the hosted applications 150A-N for the given tenant to the primary platform authentication service specified for the given tenant in the tenant-specific configuration information 185A-N.

A redirected authentication request can comprise a request to validate an authentication token retrieved from a requesting client (e.g., 120) and is redirected from one platform authentication service to another platform authentication service for validation. As described herein, such redirection can be achieved automatically and seamlessly from a client standpoint.

Single sign-on can be supported as described herein so that a user identifier accessing an application at one platform instance can access an application at another platform instance without having to repeat a sign-on process. As described herein, a tenant can specify one of the application hosting platform instances 135A-N as a primary authentication platform instance. As a result, requests for authentication are directed to the platform authentication service hosted at the specified instance.

The plurality of application hosting platform instances can serve as a platform cluster for a given tenant. Requests to access second or subsequent applications within the cluster can be processed without further interaction with the identity provider service.

In any of the examples herein, although some of the subsystems are shown in a single box, in practice, they can be implemented as computing systems having more than one device. Boundaries between the components can be varied.

For example, although the data center 130A is shown as a single entity, it can be implemented by a plurality of devices across a plurality of buildings. An identity provider 190 can be implemented within one of the data centers 130A-N, and so forth.

In practice, the systems shown herein, such as system 100, can vary in complexity, with additional functionality, more complex components, and the like. For example, additional services can be implemented as part of the application hosting platform instances 135A-N. Additional components can be included to implement security, redundancy, load balancing, auditing, and the like.

In practice, a large number of tenants 110 with a large number of user identifiers 120 can access a large number of platform instances 135A-N. Although user identifiers 120 are shown as associated with accessing applications, clients can also take the form of application instances that avail themselves of the authentication technologies as described herein.

The described computing systems can be networked via wired or wireless network connections. Alternatively, systems can be connected through an intranet connection (e.g., in a corporate environment, government environment, educational environment, research environment, or the like).

The system 100 and any of the other systems described herein can be implemented in conjunction with any of the hardware components described herein, such as the computing systems described below (e.g., processing units, memory, and the like). In any of the examples herein, the inputs, outputs, records, tokens, configuration information, and the like can be stored in one or more computer-readable storage media or computer-readable storage devices. The technologies described herein can be generic to the specifics of operating systems or hardware and can be applied in any variety of environments to take advantage of the described features.

Example 2—Example Method of Tenant-Aware Distributed Application Authentication

Figure 2:
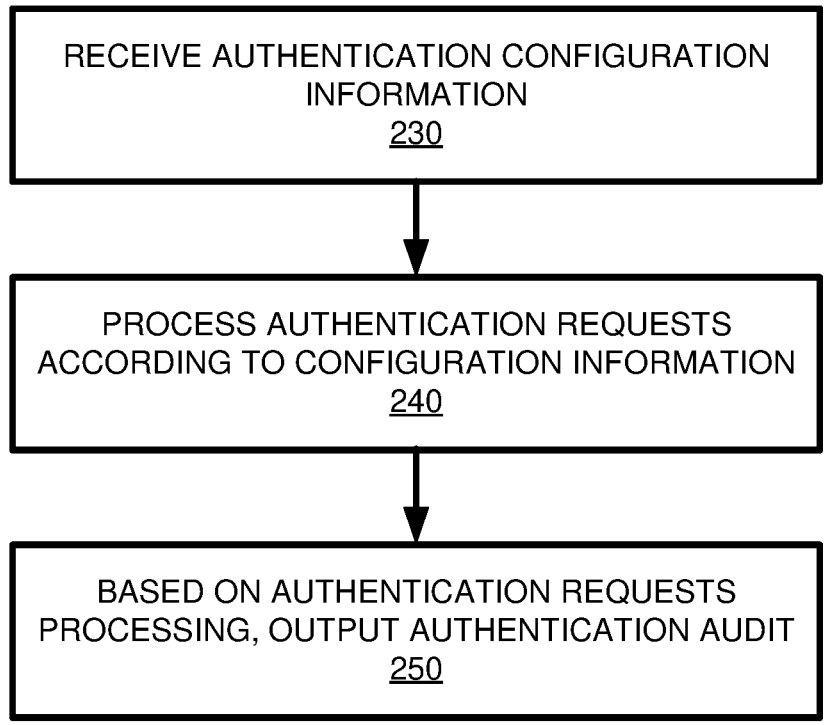
FIG. 2 is a flowchart of an example method implementing tenant-aware distributed application authentication.

FIG. 2 is a flowchart of an example method 200 of implementing tenant-aware distributed application authentication and can be implemented, for example, in a system such as that shown in FIG. 1. A plurality of tenants can be supported.

In practice, actions can be taken before configuration begins, such as planning which application hosting platform instances are to be instantiated, at which data center(s) they are to be instantiated, and the like.

At 230, configuration information is received as described herein. For a given tenant, such configuration information can include an indication of which application hosting platform instance is to serve as the primary authentication platform instance, which identity provider is desired, at which platform instances applications are to be hosted, and the like. Such configuration information can be stored as configuration records that influence subsequent authentication requests.

At 240, authentication requests (e.g., to access hosted applications) are processed according to the configuration information. As described herein, authentication requests can be directed to a platform authentication service at the primary authentication platform instance indicated in configuration information. As part of such processing, records are kept of which user identifiers are involved in such requests, whether they are granted, timestamps, and the like.

At 250, based on the authentication requests processing, an authentication audit is output as desired. Such auditing can be useful for maintaining security, discovering errors, and solving technical issues with authentication.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

In any of the technologies described herein, the illustrated actions can be described from alternative perspectives while still implementing the technologies. For example, for 230 "receive authentication configuration information" can also be described as "send authentication configuration information" for a different perspective.

Example 3—Example Tenant-Aware Distributed Application Authentication

In any of the examples herein, the task of authentication for access to applications can be distributed among a plurality of application hosting platform instances (e.g., a platform cluster). For example, a request received at one instance can be redirected to another platform instance for validation. The platform can be engineered to be tenant-aware in that different tenants can specify (e.g., the system can receive and store in authentication configuration information) different primary authentication platform instances, different preferred identity providers, different locations at which application are to be hosted, or the like.

As described herein, such locations can be indications of different geographical locations for the different tenants. Similarly, a preferred primary authentication platform instance can be represented in configuration information as a location. Determining the primary instance can then take the form of determining an instance at the configured location.

So, although there can be a primary authority for authentication (e.g., a platform authentication service at a platform instance at a designated location), the applications themselves can be distributed at multiple platform instances in a platform cluster, and the platform instances of the cluster cooperate to achieve authentication via the primary authority.

As described herein, applications can perform some of the work related to authentication. For example, an application can fetch an authentication token from a client and submit an authentication request for the token (e.g., to check the validity of the authentication token) to a platform authentication service. If no authentication token is present, the application can so indicate to the platform authentication service, which can result in sign on or provisioning.

Example 4—Example Tenants

In any of the examples herein, a variety of tenants can be supported. Such tenants typically take the form of an enterprise tenant, such as a corporation, governmental body, research institution or group, educational institution or group, or the like. By taking advantage of the technologies described herein, such tenants can greatly reduce the resources needed for administration while providing access to a wide variety of applications hosted at different data centers.

In practice, tenant user identifiers can be used by users physically located in a variety of locations. Web-based portals can be employed to provide computing services in a software-as-a-service (SaaS) scenario so that tenant users can access the hosted applications from any location having network access.

Example 5—Example Application Hosting Platform

In any of the examples herein, an application hosting platform can be used to host the applications described herein. Any number of instances of the application hosting platform can be instantiated to process incoming requests for access to applications. A set of such instances is sometimes called a "platform cluster."

A given platform instance can take the form of a set of services and configuration information as described herein. One instance can communicate to another instance to achieve redirection of authentication requests and application access requests.

Any given tenant can avail itself of a platform cluster to achieve distributed application authentication as described herein. Although the applications hosted by such a platform cluster can be diverse and heterogeneous in nature, the platform instances can share a common approach to administration, authentication, and auditing across the applications. Therefore, centralized administration of the applications running across the platform cluster can be achieved. Meanwhile, users are able to benefit from such centralized administration as well as other benefits such as single sign-on, application-to-application authentication, and the like.

In practice, a platform instance is typically restricted to execution within a specified location as described herein. So, from a tenant standpoint, an application hosting platform instance can be synonymous with a location (e.g., data center). Thus, in practice, a particular instance of an application hosting platform can be specified as a location (e.g., data center). So, a tenant can thereby specify at which physical location the instance is to be located. Therefore, any description of specifying a platform instance can be implemented as specifying a data center or geographical location. In practice, multiple instances of the platform can coexist at a same location, whether shared or separated by tenant.

As described herein, the application hosting platform can support multiple applications, sharing projects, studies, inter-tenant collaboration, and the like. Such implementations can comprise multiple applications, multiple user identifiers (from multiple tenants), and facilities for sharing data among tenants. A hosting tenant can continue to control the location where applications are hosted as described herein. However, other tenants can benefit from sharing allowed by the hosting tenant.

An orchestrating enterprise can maintain the logic and toolkit for implementing the technologies described herein. Those wishing to add applications that are compatible with the platform can do so by incorporating such logic and toolkit into their applications. Actual hosting of the applications can be done by tenants themselves, a service provider, an orchestrating enterprise, or third parties.

Example 6—Example Platform Authentication Service

In any of the examples herein, an application hosting platform instance can include a platform authentication service. As described herein, a particular platform authentication service can be designated by a tenant to be primary. Alternatively, the platform instance can be designated as primary, and the platform authentication service is thus primary. In practice, a location can be designed by an administrator, and the platform can handle the details of the authentication configuration information. For example, mappings between or among data centers, locations, instances, and services can be maintained so that the appropriate destination for a request can be determined based on a configured specified tenant-specific location.

The platform authentication service can respond to requests as described herein. In examples, applications interact with the service via authentication requests, and the service can process such requests directly (e.g., by checking stored authentication tokens) or redirect the request to a primary service. Thus, the service can be configured to determine the primary service for an incoming request and redirect the request to the primary service as described herein.

Example 7—Example Identity Providers

In any of the examples herein, any of a variety of identity providers ("IDPs") can be used. Such identity providers can be used to manage user identities. For example, a user wishing to sign on can be directed to the identity provider where a username and password are provided to initially authenticate a user. In practice, a tenant can specify its own internal identity provider service or a built-in identity provider of the application hosting platform. Alternatively, a tenant can specify a third-party identity provider, thereby delegating identity management hosting to the third party.

In practice, any number of identity provider technologies can be supported, including a web portal, security assertion markup language (SAML), web-based single sign-on, Microsoft® Active Directory, or the like.

Example 8—Example Authentication Tokens

In any of the examples herein, an authentication token can take a variety of forms. In practice, a token is a value that can be generated, stored, communicated, and validated. As described herein, such tokens can be generated, managed, and stored as token records accessible by the primary authentication platform instance. Encryption and other techniques can be used for security purposes. Token generation can be delegated to another authority as desired.

Additional information can be included in the authentication token. For example, an indication of the primary (e.g., originating, issuing, etc.) authentication platform instance can be included with the authentication token. The process of determining which instance is the primary instance can thus be accomplished by inspecting the authentication token. During the token-generation process, requests are directed to the primary instance based on tenant-specific configuration information, and the primary instance adds an indication of itself into the authentication token. Subsequent requests can thus re-use such configuration information, whether or not it is confirmed in the configuration information itself.

The authentication token can be implemented as a session token. It can thus be generated during initial authentication of a user identifier or application identifier. It is thus associated with a log-on session of a client (e.g., user identifier or application identifier). When the session ends due to sign-off or timeout, the token can similarly be automatically invalidated.

The authentication token can comprise a bearer token. Such a bearer token can be validated with a secret key generated and maintained by the primary authentication platform instance. Different secret keys can be used for different tenants and different platform instances. User bearer and application bearer tokens can be implemented.

The authentication token can be generated by including various information into plaintext (e.g., a pseudorandom value, the tenant identifier with which the token is associated, access control, such as which applications are permitted, and the like). Such plaintext can then be encrypted with the primary authentication platform instance secret key to generate the authentication token. Subsequently, when the token is received, for validation, it can be decrypted and looked up in authentication token records (e.g., by the platform authentication service at the primary instance), which can indicate which user is associated with the authentication token. The user identifier need not be incorporated into the token itself. If the decrypted token indicates a tenant identifier that does not match the tenant identifier indicated in the authentication token records, it is rejected, regardless of the token value. Access control indicated in the token can also be respected (e.g., if an attempt is made to access an unauthorized application, the associated authentication request is not validated).

Because the authentication token is validated against a central record of tokens, the central record can be updated to indicate invalidity. For example, when a user logs off, the authentication token for the session can be invalidated. Similarly, a time out can be set so that a token automatically becomes invalid after a certain period of inactivity. The period for automatic invalidity can be configured on a tenant-by-tenant basis.

In practice, validation can be achieved by accessing a service that responds to requests for validation. For example, responsive to a request comprising an authentication token, a validation result can be received from the service. Validation can be achieved by comparing a provided authentication token against stored authentication token records. Records can include additional information, such as whether the token is still valid.

Validity can require further information, such as the associated tenant. Thus, when the authentication token is created for a given tenant identifier, it can be associated in token records as associated with the tenant identifier. Subsequently, authentication requests (e.g., requests from an application to determine the validity of an authentication token) can include the tenant identifier (e.g., which can be determined by the application because the application instance can be configured to accept requests for a single given tenant only). If the tenant identifier in the authentication request does not match, validity is not confirmed by the platform authentication service, regardless of the token value.

Because sessions can be conducted over a secure channel (e.g., SSL or the like), various attacks against authentication can be avoided due to the various features described herein, such as the tenant-identifier accompanying the authentication request.

Example 9—Example Geo-Based Scenarios

In any of the examples herein, a location of where an application is to be hosted can be specified as a location in tenant-specific authentication configuration information. Such a location can comprise a physical location such as a geographical location (e.g., data center), jurisdiction (e.g., regulatory authority), region, or the like. For example, different countries can be specified for data containment, compliance, or resource allocation reasons. In some cases, a jurisdiction or region can contain more than one geographical location (e.g., different data centers can be at different geographical locations within a single region).

Tenant-specific configuration information can indicate that applications are to be hosted at a particular location. In practice, the application hosting platform can map locations to respective application hosting platform instances. For example, one or more instances can be implemented at a first location, and one or more instances can be implemented at a second location. The applications hosted at the instances are thus located at their respective locations. Similarly, when determining a primary instance, an instance located at a location indicated in configuration information can be used.

In any of the examples herein, specifying different primary authentication application hosting platform instances (e.g., for different tenants) can comprise specifying different locations.

So, tenant-specific configuration information can indicate that a first application is to be hosted within a first jurisdiction, and a second application is to be hosted within a second jurisdiction. The applications can then include logic that limits functionality to that permitted within the jurisdiction. For example, it may be desired for an application to persist data only within the geographical boundaries of the jurisdiction. The data is then physically located within the jurisdiction. The tenant-specific information can indicate that the application be hosted within the jurisdiction.

In any of the examples herein, a first application hosting platform instance can be within a first jurisdiction, and the second application hosting platform instance can be within a second, different jurisdiction. Tenant-specific configuration information can thus specify that different applications are to be hosted within different jurisdictions.

As described herein, users can continue to avail themselves of the applications without concern for where they are hosted because the authentication functionality of the platform can continue to authenticate seamlessly, regardless of at which platform instance an application is hosted.

Example 10—Example Tenant-Specific Configuration Information

In any of the examples herein, tenant-specific configuration information can be collected and used to guide authentication processing. FIG. 3 is a block diagram of an example system 300 storing tenant-specific configuration information for implementing tenant-aware distributed application authentication.

In the example, an application hosting platform instance 330A comprises an administrative service by which an administrator can access and update authentication configuration information 385A, which is stored for a variety of tenants 380A-N. The platform authentication service 340A accesses such configuration information 385A when processing authentication requests as described herein. Such a platform instance 330A can serve as any of the application hosting platform instances described herein.

Example details of tenant configuration information 380A for a particular tenant are shown and can include a specified identity provider type 382 (e.g., a service that manages identities for the tenant and configuration information used by such a service), a specified primary authentication application hosting platform instance 384 (e.g., which includes a platform authentication service that processes authentication requests, either locally or directed from other platform instances in a platform cluster), application configuration 386, and policy information 388. Specifics (e.g., network access information such as a network address) of the identity provider can also be included. Further information can be included to accommodate projects, studies, and the like. As described herein, a primary platform instance can be specified as a location and converted to a reference to an instance at the location or a service executing at the instance at the location when determined, or in advance of being determined.

The application configuration information 386 can include information specifying which applications are to be hosted at which application hosting platform instances. Requests for access to applications at platform instances that are outside of those permitted can be redirected to the specified platform instance. As described herein, one or more applications can be hosted at a first instance, while one or more applications can be hosted at a second, different instance. The platform cluster can be scaled to include additional instances as desired.

As described herein, requests to access applications at platform instances other than the primary authentication hosting platform instance can be redirected to the primary instance for authentication. Single sign-on can be achieved as described herein.

Any number of other policies can be specified in the policy information 388. For example, IP access restrictions, authentication token expiration time periods, password policies, email restrictions, user-based access control for applications, automatic timeout periods (e.g., idle session timeout), data sharing permissions, and the like can be supported.

Any variety of other configuration scenarios are possible. For example, access control can be specified at a tenant, group, or user level.

The configuration information is typically managed at the primary application hosting platform instance for a given tenant. However, such data can be synchronized across platform instances as desired.

Example 11—Example Method of Implementing Configuration

Figure 4:
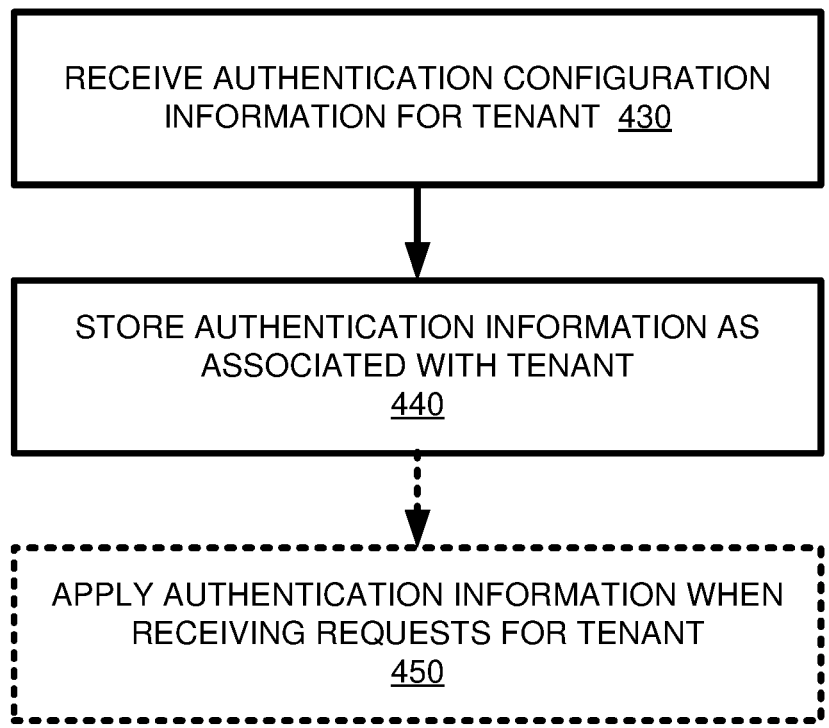
FIG. 4 is a flowchart of an example method implementing configuration for tenant-aware distributed application authentication.

FIG. 4 is a flowchart of an example method 400 of implementing configuration for tenant-aware distributed application authentication and can be implemented, for example, in a system such as that shown in FIG. 3. In practice, multiple tenants can be supported.

At 430, authentication configuration information is received for a tenant. For example, a web portal can be provided by which an administrator enters or updates configuration information via various user interfaces. As described herein, such information is typically received by the primary application hosting platform instance specified for the tenant.

At 440, the received authentication configuration information is stored as associated with the tenant.

At 450, as described herein, such authentication configuration information is applied when receiving requests to access applications by a user identifier of the tenant. For example, authentication requests can be handled as described below.

Example 12—Example Tenant Relationships with Configuration Information

Figure 5:
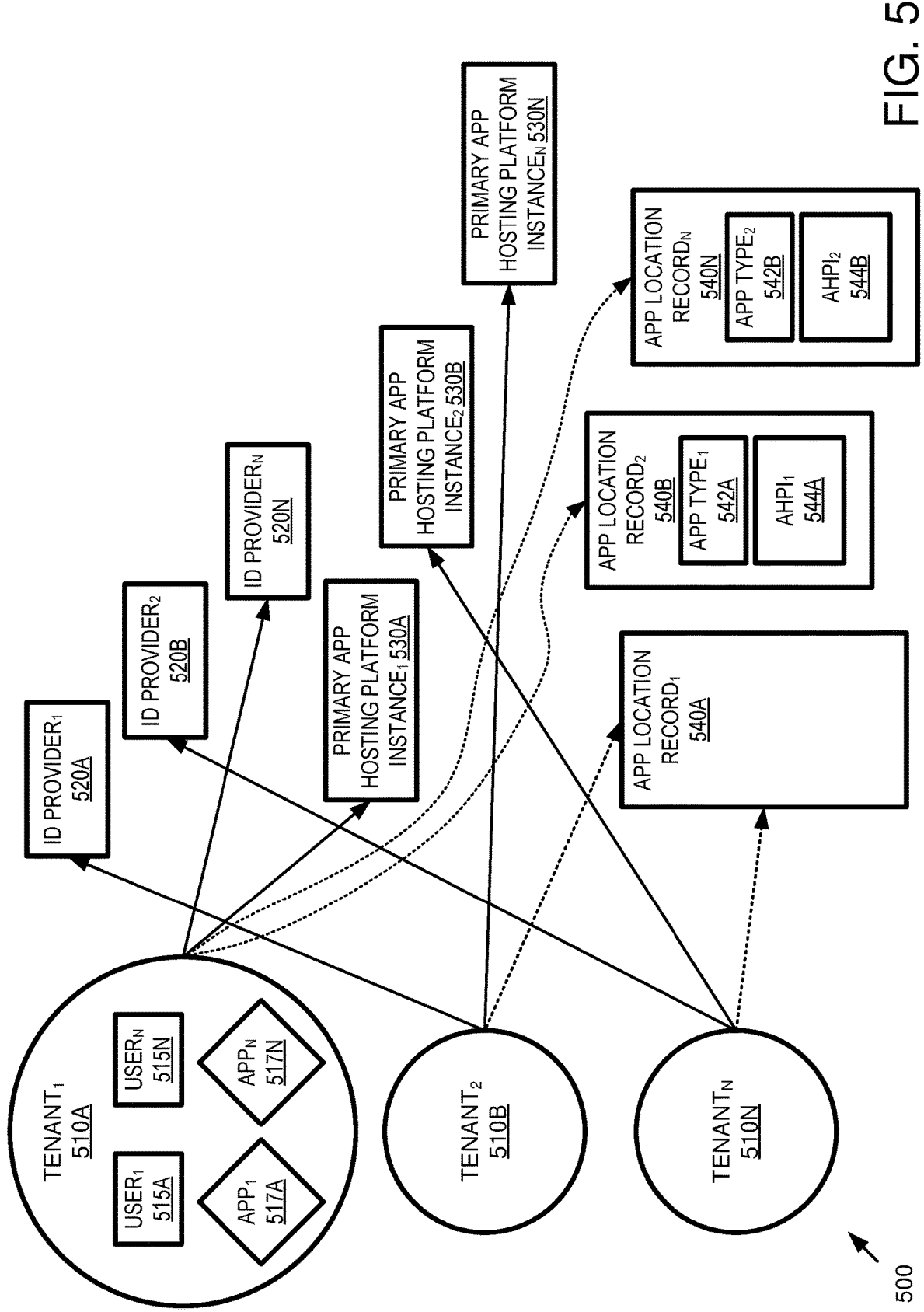
FIG. 5 is a block diagram of example relationships for particular tenants that can be stored as tenant-specific authentication configuration information.

FIG. 5 is a block diagram of example relationships 500 for particular tenants that can be stored as tenant-specific authentication configuration information in any of the examples described herein. In practice, such relationships can be stored as mappings, records, tables, or the like. An authentication configuration information service can provide such information in response to requests for it. For example, a query for the primary platform authentication service or primary authentication application hosting platform instance can include an identifier of the tenant, or the tenant can be implied. A response can provide an identity or reference to the requested service or instance.

In any of the examples herein, a user 515A-N or application instance 517A-N can be designated as associated with a tenant 510A. Such an association can be represented in authentication configuration information, explicitly included in requests, explicitly included in authentication tokens, and the like.

The example illustrates how different tenants 510A-N can specify different identity providers 520A-N and different primary application hosting platform instances 530A-N. More than one tenant 510A-N can specify the same identity provider (e.g., 520A). Similarly, more than one tenant 510A-N can specify a same data center for the primary application hosting platform instance.

Additionally, the tenants 510A-N can specify application location records 540A-N. Such a record 540B can include an indication of an application type 542A and the platform instance 544A at which applications of the application type are to be hosted. Additional records 540N can specify the same or different instances 544B for different application types 542B. The platform instances 544A-B specified for applications can be the same or different from the application hosting platform instance specified as the primary authentication application hosting platform instance for a tenant.

As shown, a tenant 510A can include a number of user identities 515A-N. For purposes of authentication, application instances 517A-N can also be treated as belonging to the tenant and be provided with credentials, allowing such application instances 517A-N to participate in and benefit from the platform as described herein.

Although the relationships may initially appear to be complex, from the perspective of a given tenant, flexibility with regard to authentication is provided while maintaining centralized control and concurrent administration across a variety of users accessing a variety of applications within a cluster of platform instances executing across a plurality of data centers. Thus, from a tenant standpoint, administrative efforts can be reduced. Meanwhile, users benefit by being able to access a wide variety of resources without regard to maintaining a wide variety of credentials.

Example 13—Example Application Registration

In any of the examples herein, an application can be registered with the platform for use by a tenant. As part of the registration process, a location at which the application is installed is received. Information about how to access the application (e.g., URL/URI) can also be received. If two instances of the same application type are executing at different locations for a tenant, two different registrations can be implemented (e.g., with different URLs/URIs).

Clients wishing to access the application do so by specifying the URL/URI, which routes the request to the location at which the application is executing. The application can then process authentication as described herein.

Example 14—Example Additional Security Layer for Application Instances

In any of the examples herein, additional layers of security can be incorporated into the technologies. For example, application-to-platform authentication can be incorporated for communications between the application and the platform (e.g., platform authentication service or the like). As part of a platform registration process for an application instance for a given tenant, the application instance can indicate the network address (e.g., URL/URI) used to access the application, and the platform can provide the application with an application instance identifier and application instance secret. An association between application instance identifiers and application instance secrets can be maintained by the platform for authentication services. Application instance secrets can be maintained in encrypted or hashed form to shield the plaintext from view.

The identifier and secret can then be used to authenticate before communications between the application instance and platform are permitted. Although sometimes described as being part of an "authentication request," in practice, a request can take the form of a plurality of messages between the application instance and the platform authentication service. Validity of such a request can be determined based on the associated authentication token, a provided tenant identifier, the application instance identifier, and the application instance secret. A platform instance can compare an incoming application instance secret with a maintained copy.

When an application requests that an authentication token be validated, in addition to the authentication token, the application can provide the application instance identifier and application instance secret. The platform authentication service can additionally authenticate the application instance identifier and application instance secret. Failure to provide the application instance credentials results in failure of authentication, regardless of the authentication token's value.

The application instance identifier and application instance secret can thus be authenticated whenever the application instances sends communications to the platform (e.g., the platform authentication service, whether local or remote). The platform can block communication with an application instance that fails to provide the application instance credentials. Any requests from such an instance can be rejected.

Example 15—Example New User Provisioning System

Figure 6:
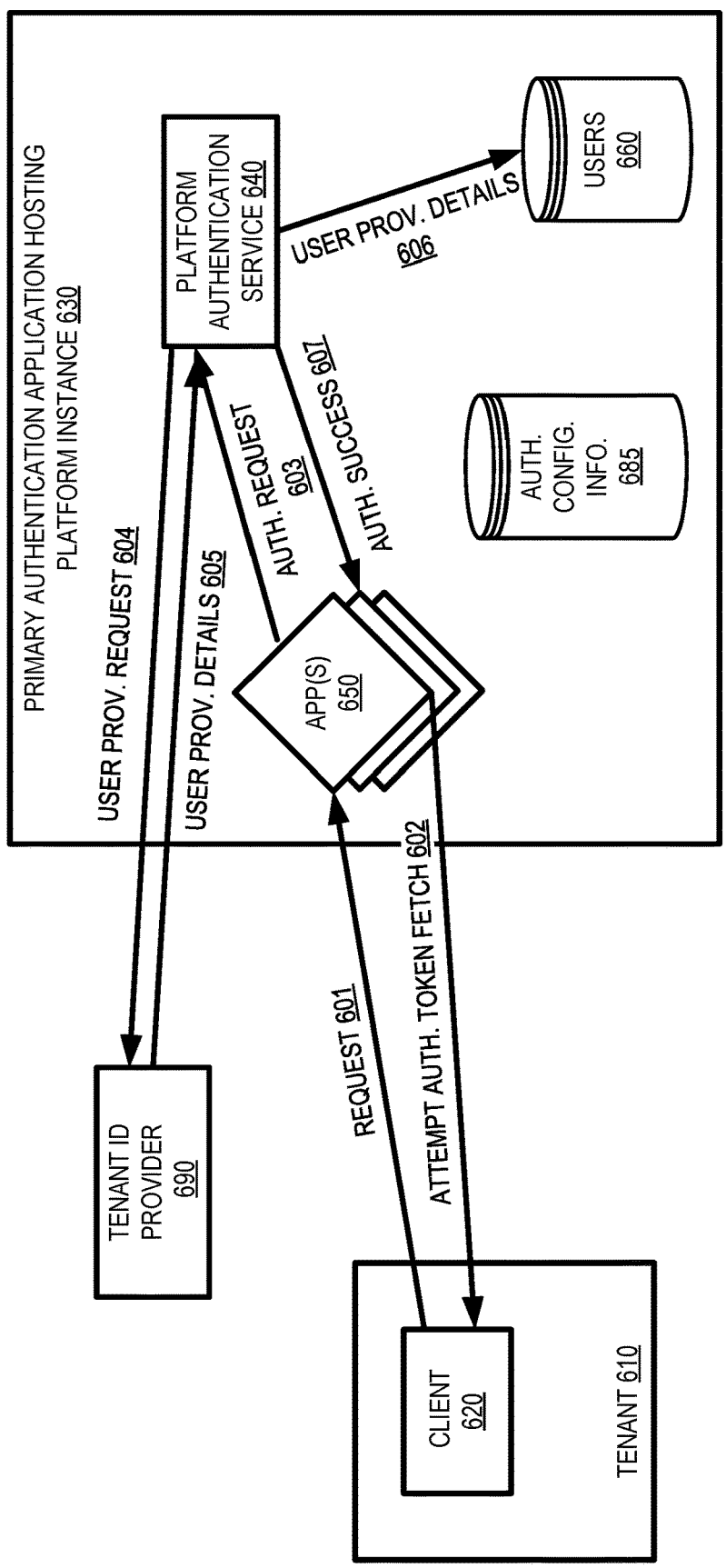
FIG. 6 is a block diagram of an example system implementing new user provisioning in a tenant-aware distributed application authentication scenario.

FIG. 6 is a block diagram of an example system 600 implementing new user provisioning in a tenant-aware distributed application authentication scenario and can be used in any of the examples herein.

In the example, a client 620 of a tenant 610 or tenant agent is configured to send a request 601 for access to an application 650 executing as part of the tenant's primary authentication application hosting platform instance 630. The application 650 can be configured as described herein to initially attempt to authenticate the request (e.g., by fetching an authentication token as described herein). However, as shown, no authentication token is present at the client 620 because the user identifier has not yet been provisioned.

In practice, users and/or administrators can be provided with a network address (e.g., uniform resource locator/indicator) by which access can be accomplished with a client such as an Internet browser. For a non-provisioned user identifier, access to the same network address can result in provisioning as described herein.

The application 650 can be in communication with the client 620 and be configured to initially attempt to fetch 602 the authentication token from the client 620. However, in the example, there is no token, so the attempt fails. The application 650 is configured to detect the failure and, as a result, send an authentication request 603 to the local platform authentication service 640 without an authentication token (e.g., a no-token authentication request).

The platform authentication service 640 is configured to receive such requests, and begin the process of generating a token, after one or more prerequisites are met (e.g., the user id of the client 620 is authenticated). The platform authentication service 640 is in communication with the identity provider 690 specified in tenant-specific authentication configuration information and interacts with the identity provider 690 to authenticate the user id.

In the example, the request 604 effectively becomes a user provisioning request (e.g., a user interface for provisioning a new user can be displayed and new user information can be processed). The identity provider 690 then responds 605 to the request with user provisioning details, which the service 640 stores 606 in user records 660.

Subsequent access by the user identifier is then associated with the registered user. Additional information can be stored in authentication configuration information 685, such as which applications 650 are accessible via the user identifier and the like.

As described herein, if the local instance 630 is not the primary authentication instance, information can be relayed to a platform authentication service at the primary instance. Thus the platform authentication service 640 can delegate the request 603 by handing it off to the primary platform authentication service as indicated in the authentication configuration information 685.

The described processing can also result in authentication token generation, which is passed to the application 650 for relay to the client 620 for persistence as described herein. The platform authentication service 640 can then control access by the user identifier to the local applications 650 as well as applications at other platform instances.

Example 16—Example Method of Provisioning a New User

Figure 7:
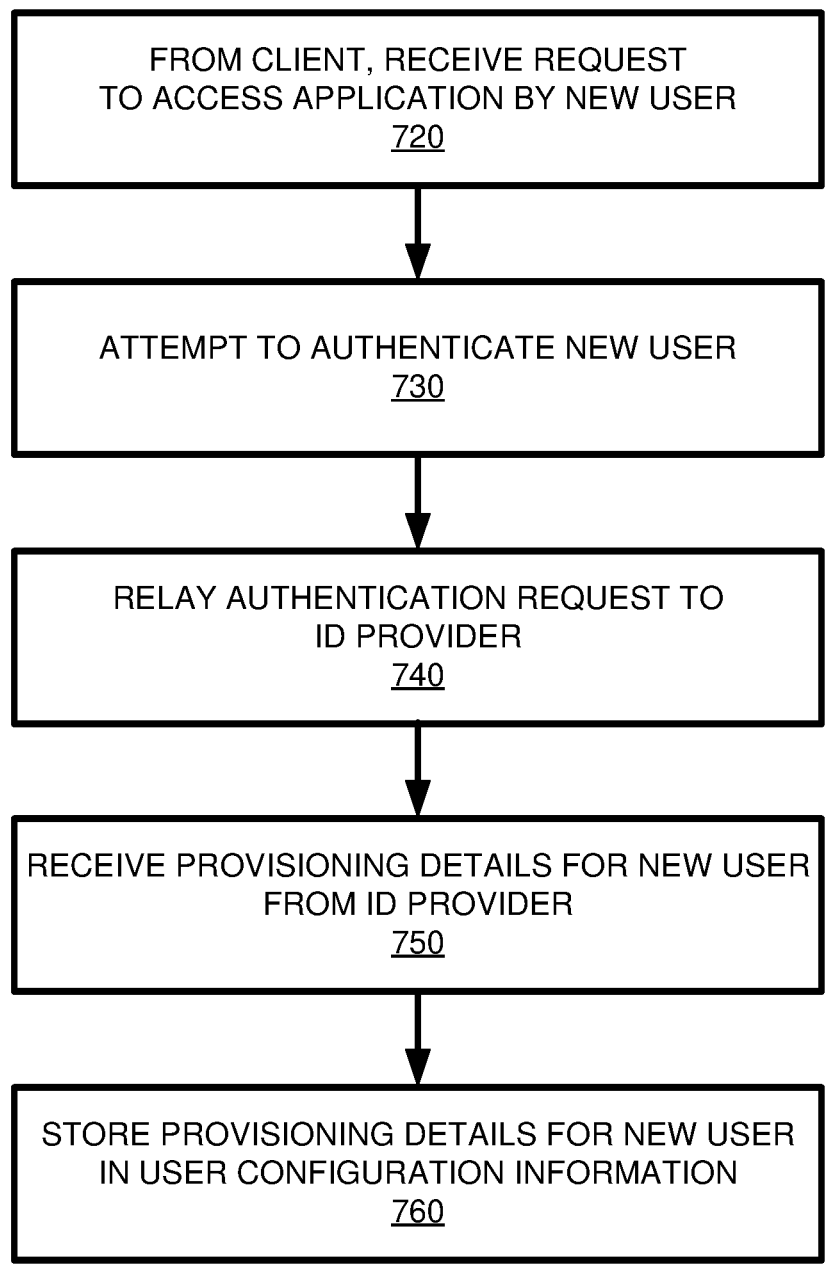
FIG. 7 is a flowchart of an example method of provisioning a new user in a tenant-aware distributed application authentication scenario.

FIG. 7 is a flowchart of an example method 700 of provisioning a new user in a tenant-aware distributed application authentication scenario and can be implemented, for example, in a system such as that shown in FIG. 6. In practice, such a method is typically performed by the primary authentication application hosting platform instance specified for the tenant associated with the user.

At 720, a request to access an application by an un-provisioned user identifier is received from a client. Such a request is typically received by an application via the access method (e.g., URL/URI) specified for the application.

At 730, an attempt is made to authenticate the access request. As described herein, such an attempt is typically resolved by fetching and validating an authentication token from the client. However, in the case of an un-provisioned user identifier, the authentication token cannot be validated (e.g., it does not exist, is expired, or is otherwise invalid). In practice, the application itself can determine that authentication fails because there is no authentication token present on the client (e.g., the request to fetch the authentication token fails). Whether or not there is a token, an authentication request can still be generated for the session.

The application can then send the authentication request to the local platform authentication service. If authentication configuration information indicates that the local service is not the primary platform authentication service for the tenant, the authentication request can be delegated to the primary platform authentication service.

In the example, the user identifier is not provisioned, so there is no authentication token. Responsive to determining that there is no token in the authentication request, the primary platform authentication service relays the authentication request for sign on.

Accordingly, at 740, the authentication request is relayed to the identity provider specified for the tenant. Thus, the identity provider of the client is determined via the configuration information for the tenant, and the request is relayed to the determined identity provider. Because the request originates from a new (e.g. non-provisioned) user identifier, the request will be processed as a provisioning request. Provisioning can take the form of multiple communications (e.g., to obtain or create the user identifier, password, authorized levels of access, and the like). For example, a user interface can be presented by which the new user selects a register function.

A default level of access can be used for tenants (e.g., configurable per tenant to be a tenant-specific default level of access for newly provisioned users) such that newly provisioned user identifiers have access to a basic set of applications. Additional applications can be added by specifying them in the authentication configuration information. Trial access can also be provided for new users that is valid for a trial period. Such information can be stored in authentication configuration information to avoid repeat trials.

At 750, provisioning details for the new user identifier are received from the identity provider.

At 760, the provisioning details for the new user identifier are stored in user configuration information (e.g., user records).

Authentication can proceed as described herein. For example, a token can be generated and provided for persistence at the client.

As described herein, the user identifier can then be used to access hosted applications in a current or future session.

Example 17—Example Network Address of Application

In any of the examples herein, a network address can be used to access an application. Different instances of the application for different tenants can have different network addresses. Similarly, different instances of the application for the same tenant at different locations can have different network addresses.

In practice, a domain name convention can be used to support fetching of authentication tokens as described herein. For example, a base domain name of a service provider (e.g., "illumina.com" "brand.illumina.com" or the like) can be used in common across network addresses for applications. Tenant identity, location identity, and an application type identifier can be prepended to the base domain name to create a network address (e.g., URL, URI, or the like) that is used to access the tenant-specific application instance at a given location.

As described herein, if a client attempts access a network address that somehow specifies a location at which the application is not permitted to execute (e.g., as indicated in the tenant-specific authentication configuration information for the tenant associated with the request), a redirect network address can be provided in response, which redirects the client to the proper network address.

Because the tenant and location information are implied by the network address, requests for access to a particular network address contain sufficient information to determine the tenant and location (e.g., by virtue of the fact that the request is received by an application configured for the tenant at a location where the application is actually executing). Therefore, requests to a platform authentication service can include such information (e.g., the tenant associated with the request, an application type, and the like) or it can be implied.

The requesting client can be configured to persist authentication tokens and respond to such requests. As described above, the network address for accessing application instances can share a base domain name. Domain names can further be configured so that applications share a tenant-specific base domain (e.g., a base domain with a prepended tenant identifier). The requesting client can be configured to provide authentication tokens for fetch requests originating within the based domain name or tenant-specific domain name only. For example, cookie functionality of an Internet browser can support such a configuration. Cookie scope can be configured to support such an implementation while denying access to authentication tokens to addresses outside of cookie scope.

Example 18—Example Clients

In any of the examples herein, a client can take the form of any program that accesses the applications hosted by the described platform instances. For example, a client can take the form of an Internet browser by which users can access application functionality via a network connection. In such a scenario, a user identifier is typically used to identify the user that is provisioned in the authentication system. Initial authentication (e.g., sign-on) can be achieved by providing a username and password as processed by the identification provider. The Internet browser can persist and later provide authentication tokens in a variety of ways, such as via cookie technology or some other client-side persistent storage mechanism that allows the token to be fetched by a server.

In any of the examples herein, clients can also take the form of application instances. In other words, application-to-application requests can be authenticated via the technologies described herein.

Example 19—Example Application-to-Application Authentication

In any of the examples herein, an application can include logic (e.g., provided as part of a platform compatible toolkit) that will persist and later provide authentication tokens, or such functionality can be delegated to the hosting platform instance. In such a scenario, an application instance of an application type can register with a platform authentication service similar to a user. A client identifier and client secret can be used.

The ability to support applications can greatly simplify configuration and administration of application-to-application communication scenarios. Therefore, users who access a first application that communicates with further applications can greatly benefit. A bearer token provided to an application instance can be called an "application bearer token" instead of a "user bearer token."

Example 20—Example System Authenticating Access to an Application

Figure 8:
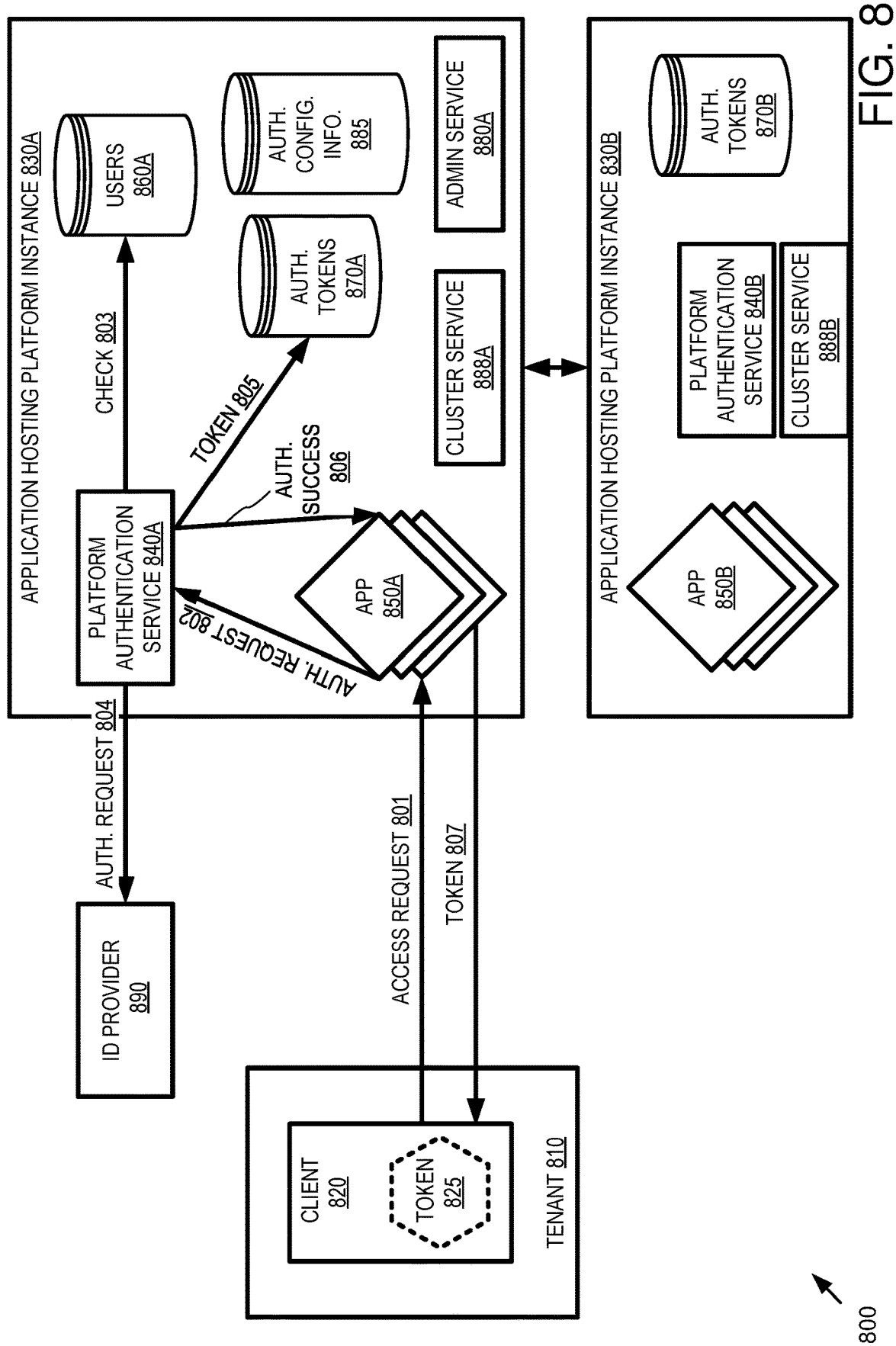
FIG. 8 is a block diagram of an example system authenticating access to an application in a tenant-aware distributed application authentication scenario.

FIG. 8 is a block diagram of an example system 800 authenticating access to an application in a tenant-aware distributed application authentication scenario. When discussed in a single sign-on scenario, the application 850A is sometimes called a "first" application executing on a "first application hosting platform instance" because access to subsequent applications within the platform cluster can be achieved without additional sign-on activity. In the example, there is no token 825 when the access request begins.

In the example, a client 820 associated with a tenant 810 sends a request 801 to access an application 850A hosted by an application hosting platform instance 830A. Such a request 801 can include details such as the desired application, user identity, tenant, and the like. A described herein, such details can be implied (e.g., an application is accessed via a URL/URI provided to users, so any access to the specified URL/URI is to the application associated with the URL/URI, and is for a particular tenant).

The application 850A contains logic that is aware of the platform authentication service 840A. The application 850A can attempt to retrieve an authentication token from the client 820, but the attempt will fail in the example. The application 850A is configured to send an authentication request 802 to the service 840A responsive to the failure.

As shown, a local instance of the service 840A is consulted first. As described herein, the service 840A can then relay the authentication request to the platform authentication service executing at the primary authentication hosting platform instance as specified in configuration information 885 for the tenant 810. In the example, the local service 840A is the primary service, so it continues to process the request.

The service 840A can be configured to check 803 user records 860A to determine whether the user is provisioned. If so, the service 840A can continue.

Because no token has been provided in the request 802, the service 840A is configured to then determine the preferred identify provider 890 specified by the tenant 810 in configuration information 885 and send an authentication request 804 thereto.

The service 840A is configured to, upon successful authentication by the identity provider 890, create an authentication token and write the authentication token to the authentication token records 870A. The service also provides a successful result 806 and the token to the application 850, which is configured to pass the token back to the client 820, which persists the token 825 for possible future use.

In any of the examples herein, a cluster service 888A, 888B can be used to register a platform instance and its location; a logical cluster of instances can then operate as a platform cluster. For example, a first instance can serve as a master, and subsequent registering instances can join the cluster by registering with the master. A request to the service 888A, 888B can return an indication of which instance is the master, provide communication with the master, or the like. When a platform instance is instantiated, the cluster service 888A, 888B can provide location information (e.g., the current location at which the instance is located) to the platform instance, and the location information can be made available to the applications 850A-B. Thus, the applications 850A, B can be made location-aware via the respective cluster services 888A, 888B.

For purposes of illustration, the application 850A is shown as hosted on the same instance 830A as the authentication service 840A. However, the application could be hosted on a different instance (e.g., 830B). If so (e.g., which can be determined by checking configuration information, the request, or the like), the authentication requests 802 can be related to the primary authentication application hosting platform instance of the tenant 810 for authentication. Thus, the preferred application hosting platform instance includes a platform authentication service that serves as the primary authority for authentication and granted tokens.

Example 21—Example Method of Authenticating Access to an Application

Figure 9:
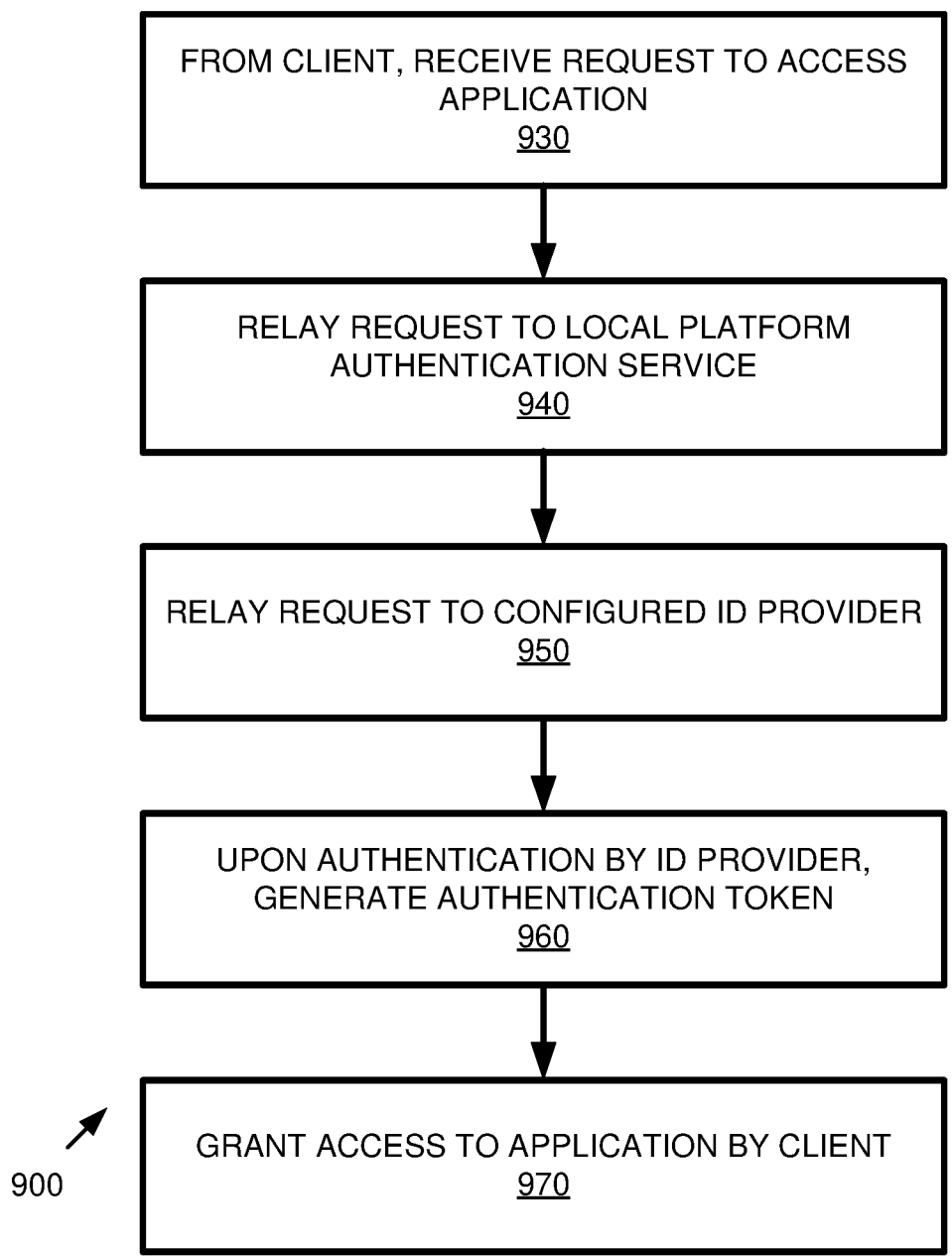
FIG. 9 is a flowchart of an example method of authenticating access to an application in a tenant-aware distributed application authentication scenario.

FIG. 9 is a flowchart of an example method 900 of authenticating access to an application in a tenant-aware distributed application authentication scenario and can be implemented, for example, in a system such as that shown in FIG. 8.

At 930, a request to access an application is received from a client associated with a tenant. As described herein, the request can be received by a client and can be determined as originating for a given tenant.

At 940, the request is relayed to the local platform authentication service. In the example, an application receives the request from a client and relays it to the platform authentication service of the platform instance hosting the application.

In some cases, the request may be directed to an impermissible platform instance. For example, tenant-specific configuration information may specify that application instances for a particular application type only be executed in a particular platform instance (e.g., data center). In such a case, the request can be redirected to the permitted platform instance. So, responsive to determining that the tenant-specific configuration information specifies that the requested application is to be hosted by a different platform instance, the request can be re-directed for hosting at the different platform instance.

The platform authentication service can check to see if the requesting user is provisioned (e.g., has a record in the user records). If so, the process can continue.

At 950, the request is relayed as an authentication request to the tenant's preferred identity provider. The client can further interact directly with the identity provider to achieve sign on.

At 960, upon authentication by the identity provider, an authentication token is generated for the application access request. The authentication token is stored locally within the application hosting platform instance.

At 970, access to the application by the client is granted. The authentication token is provided to the client, which can persist it for subsequent requests.

Example 22—Example Typical Scenarios

In any of the examples herein, a variety of recurring authentication scenarios may be supported.

In a first scenario, an initial request for access from a client is to a first application that is hosted on the primary application hosting platform instance of the tenant. After the initial sign-on, a second request for access from the client is to a second application that is hosted on a second, different application hosting platform instance. As described herein, authentication for the second request can initially be processed by the local (e.g., second) platform instance and ultimately achieved by validating a token retrieved from the client with the primary application hosting platform.

In a second scenario, an initial request for access from a client is to a first application that is hosted on a platform instance other than the primary application hosting platform instance of the tenant. In such a case, the platform instance receiving the request can contact the primary application hosting platform instance and obtain a token therefrom as part of the initial sign-on process. After the initial sign-on, a second request for access from the client is to a second application that is hosted on the primary application hosting platform instance. The request for access can be handled locally by the primary instance by validating a token retrieved from the client.

In a third scenario, an initial request for access from a client is to a first application that is hosted on a platform instance other than the primary application hosting platform instance of the tenant. In such a case, the platform instance receiving the request can contact the primary application hosting platform instance and obtain a token therefrom as part of the initial sign-on process. After the initial sign-on, a second request for access from the client is to a second application that is hosted on another platform instance other than the primary instance. As described herein, authentication for the second request can initially be processed by the local (e.g., second) platform instance and ultimately achieved by validating a token retrieved from the client with the primary application hosting platform.

In an example implementation involving three locations hosting respective three applications, a first tenant is provisioned to use (e.g., as primary instance) location one and access applications one and three. A second tenant is provisioned to use location two and access applications one and two. A third tenant is provisioned to use location three and access applications one and two.

Other authentication scenarios are possible that involve additional applications and/or platform instances.

Example 23—Example Fetching of Authentication Token

In any of the examples herein, fetching the authentication from the client can include requesting the authentication token from client-side persistent storage. For example, a cookie mechanism can be used to retrieve the authorization from a client such as an Internet browser.

Such fetching can be achieved without further user input. Thus, single sign-on can be achieved. Accordingly, the user identifier need not log-on again.

The token can be fetched to the platform instance hosting the application to which access was requested (e.g., fetched by the application to which access was requested) and then provided to the primary authentication platform instance for validation.

Example 24—Example Authentication Object

When user identifiers are authenticated against the primary authentication platform instance, an authentication object containing various information can be provided back to the calling application. Such information can include an indication of the primary authentication platform instance associated with the tenant; the applications enabled for the user and associated application instance as well as one or more roles for the user identifier within the application; and containers, projects, and studies specific to the application as well as permissions for them.

Example 25—Example System Achieving Single Sign-On

Figure 10:
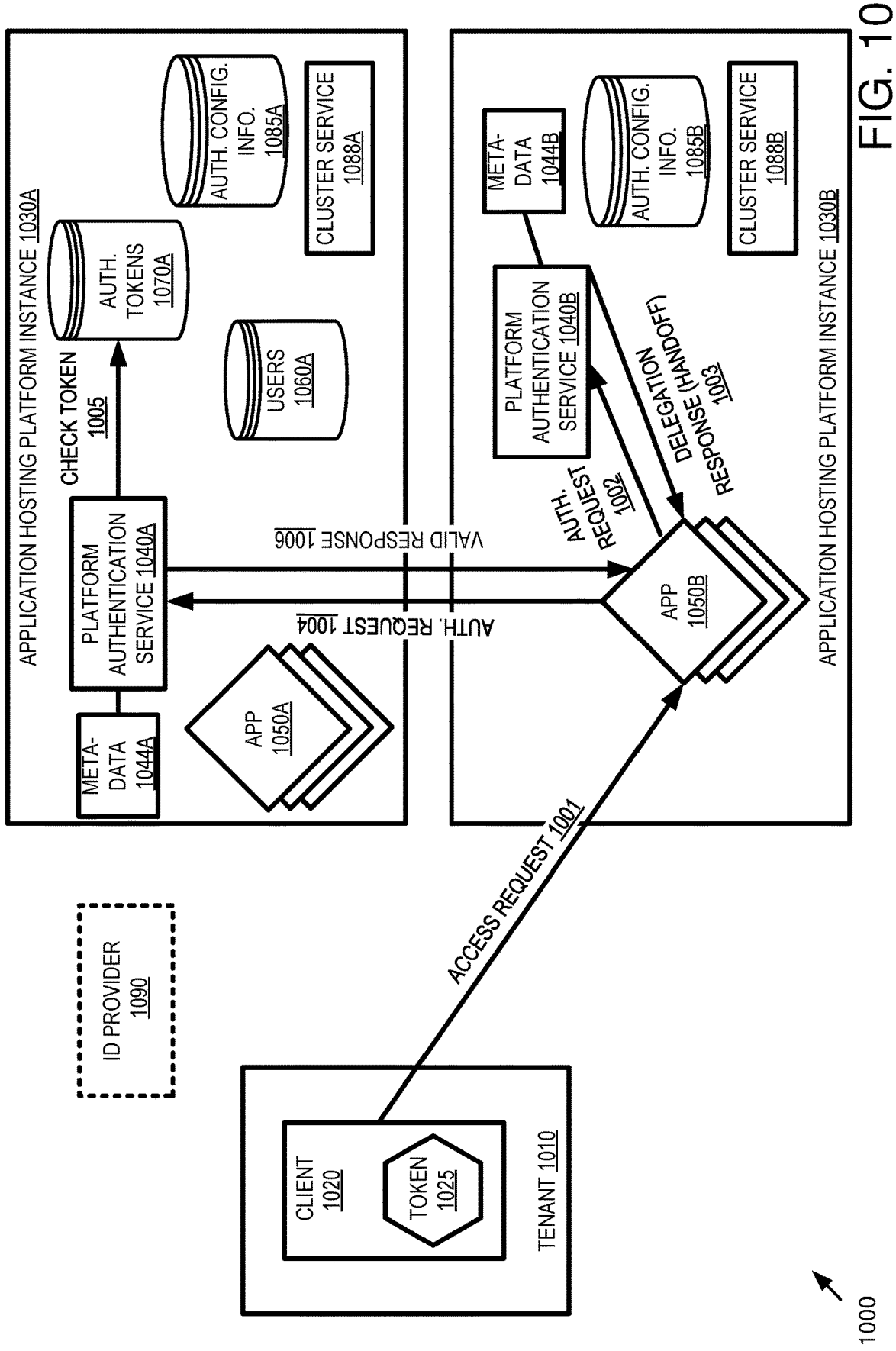
FIG. 10 is a block diagram of an example system achieving single sign-on when accessing a second application in a tenant-aware distributed application authentication scenario.

FIG. 10 is a block diagram of an example system 1000 achieving single sign-on when accessing a second application in a tenant-aware distributed application authentication scenario. The application 850A described above with reference to FIGS. 8 and 9 can be considered the first application in a single sign-on scenario.

In the example, a client 1020 associated with a tenant 1010 has access to a token 1025 and attempts access to a second application 1050B via an access request 1001. In practice, the access request 1001 does not include the token 1025. However, the access request can take the form of a network address from which the tenant 1010 can be determined. Because the network address can be configured as described herein, the application instance and tenant identifier are implied in the request 1001.

As described herein, the client 1020 need not contain logic that recognizes the stored token 1025 to be a token as such. Instead, it can simply provide the token 1025 in response to a request for a client-side persisted variable.

The application 1050B can be configured to perform some initial processing to determine whether the request for access is from an unauthenticated session. If so determined, the application 1050B can do further processing by fetching the authentication token 1025 from the client 1020. In the example, the fetching is successful because there is an authentication token 1025 at the client 1020.

The hosted applications of the platform instance 1030B are configured to forward 1002 unauthenticated access requests to the local platform authentication service 1040B. The service 1040B is configured to determine whether it is the primary service for the tenant 1010. In the example, the service 1085 is not (e.g., as indicated in the authentication configuration information 1085B), so the service 1040B sends a delegation response 1003 to handoff the request to the primary service 1040A. Subsequently, the application 1050B can be in communication with the primary platform authentication service 1040A to accomplish authentication.

The application 1050B can be configured to send the authentication token to the service 1040A as part of an authentication request 1004. The primary platform authentication service 1040A of the application hosting platform instance 1030A is indicated to be the preferred instance in the authentication configuration information 1085B.

The platform authentication service 1040A (e.g., serving as primary authority) then checks 1005 the authentication token against the stored authentication tokens 1070A (e.g., generated as part of the process shown in FIGS. 8 and 9). The service 1040A is configured to send an authentication request valid response 1006 upon successful validation of the authentication token provided by the requesting application 1050B). Other items of information can be validated as described herein as part of validity processing. The application 1050B is configured to then allow access for the session with the client 1020.

As shown, the identity provider 1090 need not be involved or consulted during the subsequent authentication, due to the presence of the token 1025, which is authenticated by the service indicated as primary by the tenant 1010 in configuration information (e.g., in 1085A and 1085B).

A cluster service 1088A, 1088B as described herein can be used to register a platform instance and its location; a logical cluster of instances can then operate as a platform cluster.

As shown in the example, metadata 1044A, 1044B can be used to lookup information to handle the request. For example, the metadata 1044A, 1044B can format configuration information from 1085A, 1085B so that it can be easily checked (e.g., metadata serves as a cache for the authentication configuration information). For example, the metadata 1044A, 1044B can store a map of tenant identifiers to their respective associated primary locations (e.g., primary authentication application hosting platform instances). Thus, requests for authentication (e.g., that include the tenant identifier) can be immediately routed to the primary platform instance because the instance can be determined with the incoming requesting tenant identifier via the map. Alternatively, such information can be consulted from the authentication configuration information 1085A, 1085B.

From the client's standpoint, single sign-on can be achieved because the token is automatically fetched by the application hosting platform without affirmative action by the client. Thus, subsequent sign-on activity need not be performed.

Example 26—Example Method of Achieving Single Sign-On

Figure 11:
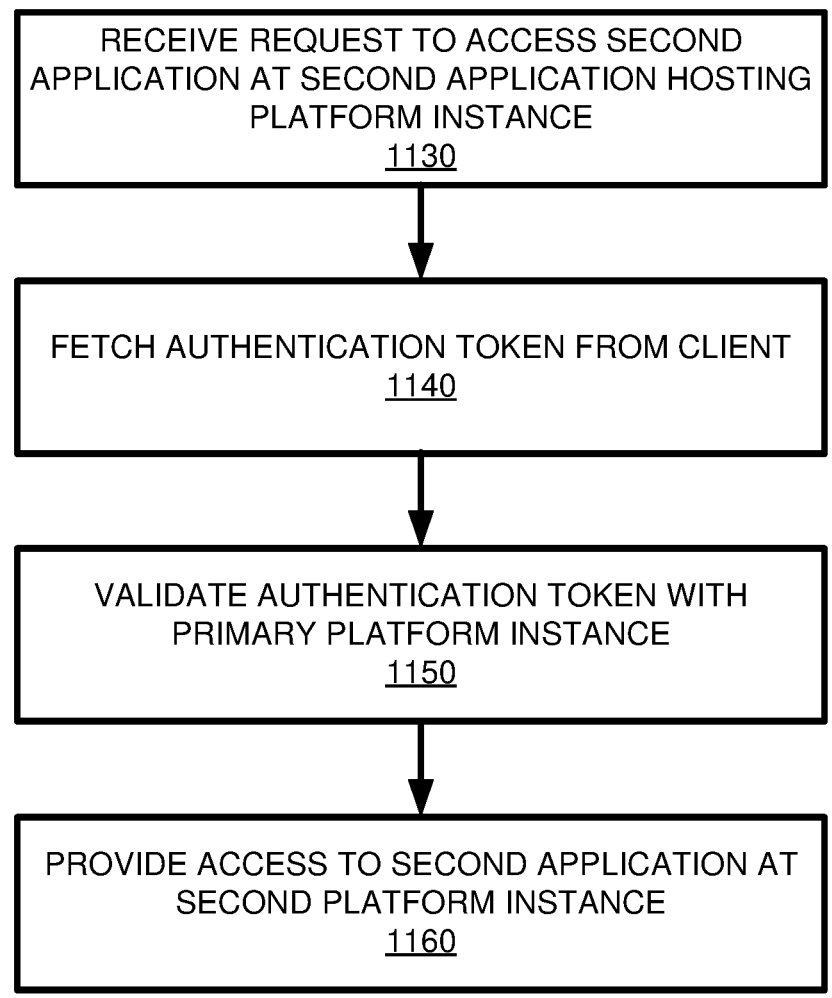
FIG. 11 is a flowchart of an example method of achieving single sign-on when accessing a second application in a tenant-aware distributed application authentication scenario.

FIG. 11 is a flowchart of an example method 1100 of achieving single sign-on when accessing a second application in a tenant-aware distributed application authentication scenario and can be implemented, for example, in a system such as that shown in FIG. 10. In practice, the method 1100 can be performed by a second application hosting platform instance 1030B. The application 850A described above with reference to FIGS. 8 and 9 can be considered the first application in a single sign-on scenario. The method 1100 can authenticate a client accessing a cluster of a plurality of application hosting platform instances. Such a cluster can include a first instance 1030A, a second instance 1030B, as well as other platform instances as described herein.

At 1130, a request to access a second application hosted by a second application hosting platform instance is received from a client. As described herein, such a request can be received during a session with a first application hosted at a first application hosting platform instance. The first application and the second application are hosted by different application hosting platform instances, and either application can be hosted at the primary application hosting platform instance. The client has already been authenticated to access the first application hosted on another instance of the application hosting platform via an authentication token (e.g., as described above with reference to FIGS. 8 and 9).

The first and second application can be accessed using domains having a common or partially common tenant-specific domain name or domain name portion as described herein.

At 1140, responsive to the request, an authorization token is fetched from the client. In practice, there may not be an authorization token (or it is expired, etc.), in which case, a scenario similar to that shown in FIGS. 8 and 9 is then followed. As described herein, the application can fetch the token, and has access to it because the first and second application are accessed using domains having commonality.

One of the instances in the platform instance cluster (e.g., comprising platform instances 1030A, 1030B, and any others in the cluster) can be determined as being a primary authentication application hosting platform instance. In practice, the primary authentication instance can be the same or a different instance than that hosting the applications.

Tenant-specific configuration information can specify the primary authentication platform application hosting instance. Different tenants can specify different primary authentication application hosting instances (e.g., by specifying different locations, data centers, or the like), and such preferences are stored as tenant-specific authentication configuration information as described herein. The tenant associated with the request is implied because it is directed to a network address associated with the tenant (e.g., associated with a tenant-specific domain name).

In the example, the platform authentication service reads such tenant-specific configuration information to determine that the primary application hosting platform instance is not the local instance, so the token is provided to the primary platform, which validates the token and provides confirmation that the token is valid responsive to checking previously granted tokens. The validation request can comprise the authentication token or otherwise provide access to it (e.g., via reference).

As described herein, the local platform authentication service can hand off requests to the requesting application so that it is no longer involved in the request (e.g., the application and the primary service interact directly).

At 1150, the authentication token is validated with the primary authentication application hosting platform instance (e.g., which may not be local). A validation request can be sent for the authentication token to the primary authentication application hosting platform instance.

At 1160, responsive to receiving confirmation that the token is valid, access to the second application hosted at the second instance of the application hosting platform instance is granted for the requesting client.

The client can then access the functionality of the second application.

As described, fetching the authentication token from the client can be performed by reusing the authentication token already stored at the client as a result of authentication with the first application. A platform instance can be synonymous with data center or other location in situations where platform instances is designated as associated with a data center or other location.

Example 27—Example Applications

In any of the examples herein, an application can take the form of any of a variety of programs. In practice, logic can be included in the application so that it can successfully interact with the platform. For example, authentication requests can be sent to the platform authentication service as described herein. Logic for handling incoming requests to other applications can be included as well.

Example 28—Example Application Redirect

In any of the examples herein, tenant-specific configuration information can specify on which of the application hosting platform instances applications are to be hosted. Requests to platform instances other than the platform instance on which the tenant-specific configuration information specifies that the application is to be hosted are redirected to the platform instance on which the tenant-specific configuration information specifies that the second application is to be hosted.

In this way, tenants can control at what instances applications are accessed. Physical containment of data can thus be enforced as described herein.

Example 29—Example Application-to-Application Implementation

In an application-to-application implementation, a request from a client is issued by an application instance having a client identifier and a client secret. The application instance is initially authenticated to access a first application via the client identifier and client secret. The application instance persists the authentication token and provides it upon a fetch request from a platform instance.

The application instance can then be authenticated to access the second application via the authentication token as described herein. In such a case, the application instance serves as a client as described herein.

Example 30—Example User Interfaces

In any of the examples herein, user interfaces can be presented at clients to facilitate access to applications. For example, an icon or drop down menu can be provided by which a user can select a desired application. The icon or drop down menu can include references to the preferred platform instance for the given application. Such user interface elements can be provided as part of a user interface that allows access to multiple applications and can be incorporated into an application itself. For example, one application may display an option to access another application.

As described herein, different applications can be hosted at different platform instances. The underlying reference to the application can include an indication of the platform instance configured to host the application as indicated in configuration information. So, when the user interface is generated, such references can be placed so that the rendered user interface (e.g., in an Internet browser) includes user interface elements that will direct an application request to the permitted platform instance.

If a user somehow acquires or manufactures a reference to a platform instance that is not permitted, application redirection can be implemented as described herein.

Example 31—Example Auditing

In any of the examples herein, as authentication requests are processed, an audit trail can be generated. For example, any failed or successful access attempts can be written to an audit log with associated details (e.g., requesting user identifier, IP address, requested application, authentication result). Redirects to other instances for authentication requests and redirects to other locations for hosted applications can also be logged.

Subsequently, such logs can be output as an authentication audit. An administrator can access such logs for a variety of purposes, such as load planning, problem solving, security audits, and the like.

Example 32—Example Implementation

In any of the examples herein, an implementation can be directed to genomics project and studies involving collaboration and sharing of data across different applications hosted in different locations. Analysis and clinical decision making can be supported. Applications can be hosted in different geographical regions based on computing resource choices and tenant choice.

A tenant can be managed from one geographical location and provide sign sign-on (SSO) capabilities for application deployed in multiple geographical locations.

An authentication system can be deployed in different geographical locations and forms a tenant-aware authentication cluster. In many cases, new software (e.g., clients) are not required because current software (e.g., Internet browser) can be used.

A service provider can manage a tenant's application access and policies in a single location and provide a choice to the tenant of various authentication schemes (e.g., identity providers) and geographical locations for authentication.

An enterprise tenant user can login to one system to access multiple applications deployed in multiple geographical locations.

The enterprise tenant can control where authentication requests are originated and serviced, thus reducing auditing costs.

The authentication servers (e.g., platform instances) can form a cluster, and the tenant can access an application from any geographical location.

The system can be scalable. Authentication servers can be horizontally scaled and each can publish its node information (e.g., including health) between the servers. Thus, operation costs can be reduced.

Example 33—Example Other Implementation of Method

In any of the examples, a method can be used to achieve access to applications. Technology from any of the examples herein can be incorporated into the following method.

In a computing cluster spanning a plurality of data centers supporting a plurality of tenants, from a client authenticated to access a first application via a bearer authentication token granted by a primary platform authentication service as a result of authentication by an identity provider specified in confirmation information for a particular tenant out of the plurality of tenants, a request to access a second application can be received.

The bearer authentication token from the client can be fetched. Such fetching can be performed without further input by a user.

A primary authentication application hosting platform instance can be determined for the client. For example, tenant-specific configuration information can indicate the primary instance. Based on the tenant associated with the incoming request, the primary instance can be determined from a mapping of tenant identifiers to platform instance references.

An authentication request can be sent to the primary platform authentication service associated with the primary authentication application hosting platform instance for validation. The authentication request can comprise the bearer authentication token, a tenant identifier of the particular tenant, an application instance identifier of the second application, and an application secret of the second application.

Responsive to the sent authentication request, a communication can be received from the primary platform authentication service indicating that the authentication request is valid. The bearer token, tenant identifier, application instance identifier, and application instance secret can also be validated as part of validation of the request. Otherwise, validation fails.

Responsive to receiving the communication that the authentication request is valid, access by the client to the second application can be granted.

In such a scenario, the first application can be hosted by a first instance of an application hosting platform executing at a first data center, and the second application can be hosted by a second, different instance of the application hosting platform executing at a second, different data center.

As described herein, the first application and the second application can be accessed by specifying a network location (e.g., URL, URI, or the like) sharing a common base domain name Example 34—Example Additional Information In any of the examples herein, a single point of entry for authentication can be supported as described herein. Such a single point of entry can serve for any application provisioned in any geographical location; therefore, auditing can be centralized to a single geographical location.

An authentication server (e.g., application hosting platform instance) can communicate with other authentication servers and publish tenant information.

Incoming requests for the tenant are then routed to the appropriate authentication server.

An enterprise tenant with its own single sign-on solution can be integrated seamlessly, thus reducing the number of integration points.

Example 35—Example Computing Systems

Figure 12:
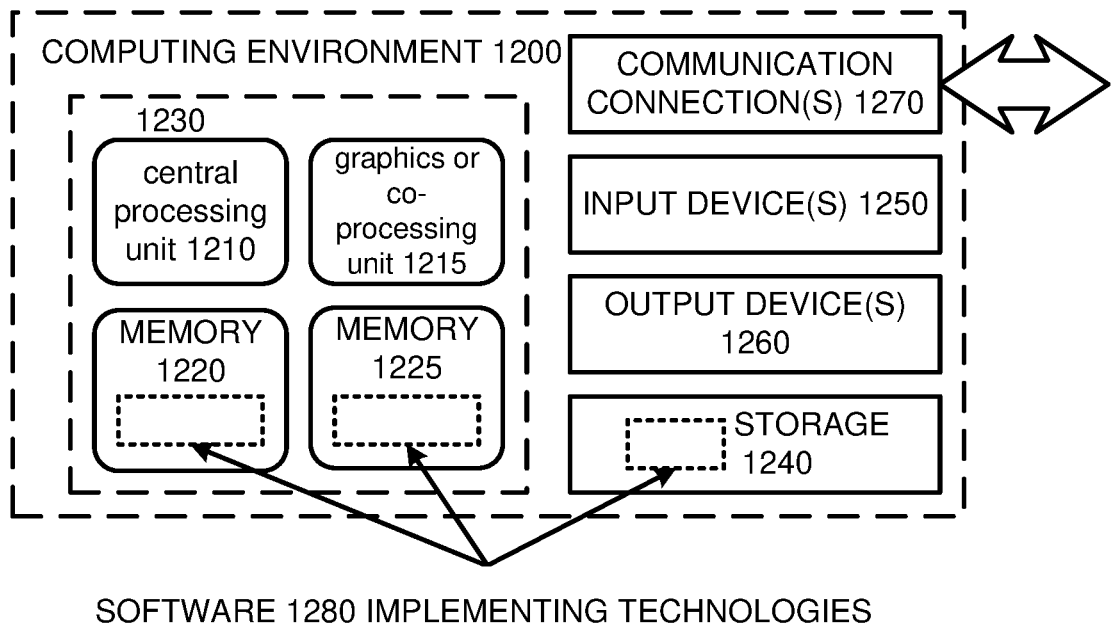
FIG. 12 is a diagram of an example computing system in which described embodiments can be implemented.

FIG. 12 illustrates a generalized example of a suitable computing system 1200 in which several of the described innovations may be implemented. The computing system 1200 is not intended to suggest any limitation as to scope of use or functionality, as the innovations may be implemented in diverse computing systems, including special-purpose computing systems. In practice, a computing system can comprise multiple networked instances of the illustrated computing system.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions. A processing unit can be a central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. For video encoding, the input device(s) 1250 may be a camera, video card, TV tuner card, or similar device that accepts video input in analog or digital form, or a CD-ROM or CD-RW that reads video samples into the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 36—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

FURTHER DESCRIPTION

Any of the following embodiments can be implemented.

Clause 1. A computer-implemented method of authenticating clients accessing a cluster of a plurality of application hosting platform instances, the method comprising:
from a client authenticated to access a first application hosted on a first application hosting platform instance of the cluster via an authentication token, receiving, at a second instance of the application hosting platform, a request to access a second application hosted on the second application hosting platform instance of the cluster;
responsive to the request, fetching the authentication token from the client to the second instance of the application hosting platform;
determining one of the application hosting platform instances of the cluster as being a primary authentication application hosting platform instance;
sending a validation request for the authentication token to the primary authentication application hosting platform instance;
receiving validation confirmation of the authentication token from the primary authentication application hosting platform instance; and
responsive to receiving validation confirmation, granting access to the second application hosted on the second application hosting platform instance to the client.

Clause 2. One or more computer-readable media comprising computer-executable instructions that when executed cause a computing system to perform the method of Clause 1.

Clause 3. The method of Clause 1 wherein:
the validation request comprises the authentication token.

Clause 4. The method of any of Clauses 1 or 3 wherein:
the primary authentication application hosting platform instance is specified in tenant-specific configuration information; and
determining one of the instances of the cluster as being the primary authentication application hosting platform instance is performed via the tenant-specific configuration information.

Clause 5. The method of Clause 4 wherein:
different primary authentication application hosting platform instances are received for different tenants.

Clause 6. The method of Clause 5 wherein:
receiving different primary authentication application hosting platform instances comprises receiving indications of different geographical locations for the different tenants.

Clause 7. The method of any of Clauses 4-6 wherein:
the tenant-specific configuration information specifies on which of the platform instances the second application is to be hosted.

Clause 8. The method of Clause 7 further comprising:
redirecting requests to platform instances other than the platform instance on which the tenant-specific configuration information specifies that the second application is to be hosted to the platform instance on which the tenant-specific configuration information specifies that the second application is to be hosted.

Clause 9. The method of any of Clauses 1 or 3-8 wherein:
fetching the authentication token from the client comprises requesting the authentication token from client-side persistent storage.

Clause 10. The method of claim any of Clauses 1 or 3-9 wherein:
the request from the client is issued by an application instance having a client identifier and a client secret;
the application instance is initially authenticated to access the first application via the client identifier and client secret;
the application instance persists the authentication token; and
the application instance is authenticated to access the second application via the authentication token.

Clause 11. The method of any of Clauses 1 or 3-10 wherein:
fetching the authentication token from the client is performed by reusing the authentication token already stored at the client as a result of authenticating with the first application.

Clause 12. The method of Clause 11 wherein:
the authentication token comprises a bearer token into which a tenant identifier has been encrypted;
the validation request comprises a requesting tenant identifier; and
validation fails if the requesting tenant identifier does not match the tenant identifier incorporated into the authentication token.

Clause 13. The method of any of Clauses 11 or 12 wherein:
the authentication token is associated with a log-on session; and
the authentication token is invalidated when the log-on session ends.

Clause 14. The method of any of Clauses 11-13 wherein:
the authentication token comprises an indication of the primary authentication application hosting platform instance.

Clause 15. A computing system comprising:
one or more processors;
memory;
a plurality of application hosting platform instances comprising respective platform authentication services configured to store and validate authentication tokens, one or more respective hosted applications, and tenant-specific authentication configuration information for a plurality of tenants;
wherein the platform authentication services of the application hosting platform instances are configured serve as a primary platform authentication service according to the tenant-specific authentication configuration information of a given tenant of the tenants; and
wherein the platform authentication services are configured to redirect authentication requests from the hosted applications for the given tenant to the primary platform authentication service specified for the given tenant in the tenant-specific authentication configuration information.

Clause 16. The computing system of Clause 15 wherein:
the primary platform authentication service is specified in the tenant-specific configuration information as a geographical location.

Clause 17. The computing system of any of Clauses 15-16 wherein:
a redirected authentication request comprises a request to validate an authentication token retrieved from a requesting client and is redirected from one platform authentication service to another platform authentication service for validation.

Clause 18. The computing system of any of Clauses 15-17 wherein:
the platform authentication services initially authenticate clients requesting access to the applications via an identity provider service specified in the tenant-specific configuration information.

Clause 19. The computing system of Clause 17 wherein:
the plurality of application hosting platform instances serve as a cluster of instances for a given tenant; and
requests to access second or subsequent applications within the cluster are processed without further interaction with the identity provider service.

Clause 20. The computing system of any of Clauses 15-19 further comprising:
an identity provider service specified in the tenant-specific configuration information;
wherein the platform authentication services relay initial authentication requests to the identity provider service based on the tenant-specific configuration information and support a plurality of identity provider services.

Clause 21. One or more computer-readable media comprising computer-executable instructions that when executed cause a computing system to perform a method comprising:
in a computing cluster spanning a plurality of data centers supporting a plurality of tenants, receiving, from a client authenticated to access a first application via a bearer authentication token granted by a primary platform authentication service as a result of authentication by an identity provider specified in confirmation information for a particular tenant out of the plurality of tenants, a request to access a second application;
fetching the bearer authentication token from the client;
determining a primary authentication application hosting platform instance for the client;
sending an authentication request to the primary platform authentication service of the primary authentication application hosting platform instance for validation, wherein authentication request comprises the bearer authentication token, a tenant identifier of the particular tenant, an application instance identifier of the second application, and an application secret of the second application;
receiving a communication from the primary platform authentication service indicating that the authentication request is valid; and
responsive to receiving the communication that the authentication request is valid, granting access by the client to the second application;
wherein the first application is hosted by a first instance of an application hosting platform executing at a first data center, and the second application is hosted by a second, different instance of the application hosting platform executing at a second, different data center.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. All that comes within the scope and spirit of the claims is therefore claimed.

What is claimed is:

1. A computer-implemented method of authenticating clients accessing a cluster of a plurality of application hosting platform instances, the method comprising:
from a client authenticated to access a first application hosted on a first application hosting platform instance of the cluster via an authentication token, receiving, at a second instance of the application hosting platform, a request to access a second application hosted on the second application hosting platform instance of the cluster;
responsive to the request, fetching the authentication token from the client to the second instance of the application hosting platform;
determining one of the application hosting platform instances of the cluster as being a primary authentication application hosting platform instance based on tenant-specific authentication configuration information, wherein the tenant-specific authentication configuration information comprises a specified primary authentication application hosting platform instance;
sending a validation request for the authentication token to the primary authentication application hosting platform instance;
receiving validation confirmation of the authentication token from the primary authentication application hosting platform instance; and
responsive to receiving validation confirmation, granting access to the second application hosted on the second application hosting platform instance to the client, wherein single sign-on is achieved when accessing the second application in a tenant-aware distributed application authentication scenario.

2. The computer-implemented method of claim 1 further comprising:
recording a timestamp for the request to access the second application hosted on the second application hosting platform instance of the cluster.

3. The computer-implemented method of claim 1 further comprising:
invalidating the authentication token when a log-on session of the client ends.

4. The computer-implemented method of claim 1 further comprising:
invalidating the authentication token after a time out period expires.

5. The computer-implemented method of claim 1 wherein:
tenants can specify different primary authentication platform instances, different preferred identity providers, and different locations at which applications are to be hosted.

6. The method of claim 1 wherein:
determining one of the instances of the cluster as being the primary authentication application hosting platform instance is performed via the tenant-specific authentication configuration information.

7. The method of claim 1 wherein:
fetching the authentication token from the client comprises requesting the authentication token from client-side persistent storage.

8. The method of claim 1 wherein:
the request from the client is issued by an application instance having a client identifier and a client secret;
the application instance is initially authenticated to access the first application via the client identifier and client secret;
the application instance persists the authentication token; and
the application instance is authenticated to access the second application via the authentication token.

9. The method of claim 1 wherein:
fetching the authentication token from the client is performed by reusing the authentication token already stored at the client as a result of authenticating with the first application.

10. A computing system comprising:
one or more processors;
memory;
a plurality of application hosting platform instances comprising respective platform authentication services configured to store and validate authentication tokens, one or more respective hosted applications, and tenant-specific authentication configuration information for a plurality of tenants;
wherein the platform authentication services of the application hosting platform instances are configured serve as a primary platform authentication service according to the tenant-specific authentication configuration information of a given tenant of the tenants and the tenant-specific authentication configuration information comprises a specified primary authentication application platform instance;
wherein the platform authentication services are configured to redirect authentication requests from the hosted applications for the given tenant to the primary platform authentication service specified for the given tenant in the tenant-specific authentication configuration information;
wherein a redirected authentication request comprises a request to validate an authentication token retrieved from a requesting client and is redirected from one platform authentication service to another platform authentication service for validation;
wherein the plurality of application hosting platform instances serves as a cluster of instances for a given tenant;
wherein a request to access a second application within the cluster is processed without further interaction with an identity provider service; and
wherein single sign-on is achieved when accessing the second application in a tenant-aware distributed application authentication scenario.

11. The computing system of claim 10 wherein:
a timestamp is recorded for the request to access the second application within the cluster.

12. The computing system of claim 10 wherein:
the authentication token is invalidated when a log-on session of the requesting client ends.

13. The computing system of claim 10 wherein:
the authentication token is invalidated after a time out period expires.

14. The computing system of claim 10 wherein:
a redirected authentication request comprises a request to validate an authentication token retrieved from a requesting client and is redirected from one platform authentication service to another platform authentication service for validation.

15. The computing system of claim 14 wherein:
the primary platform authentication service generates and maintains different secret keys for different of the plurality of tenants.

16. The computing system of claim 10 further comprising:
an identity provider service specified in the tenant-specific authentication configuration information;
wherein the platform authentication services relay initial authentication requests to the identity provider service based on the tenant-specific authentication configuration information and support a plurality of identity provider services.

17. One or more non-transitory computer-readable media comprising instructions that, when executed by a computing system, cause the computing system to perform a computer-implemented method of authenticating clients accessing a cluster of a plurality of application hosting platform instances, the method comprising:
from a client authenticated to access a first application hosted on a first application hosting platform instance of the cluster via an authentication token, receiving, at a second instance of the application hosting platform, a request to access a second application hosted on the second application hosting platform instance of the cluster;
responsive to the request, fetching the authentication token from the client to the second instance of the application hosting platform;
determining one of the application hosting platform instances of the cluster as being a primary authentication application hosting platform instance based on tenant-specific authentication configuration information comprising a specified primary authentication application hosting platform instance, wherein the tenant-specific authentication configuration information comprising the specified primary authentication application hosting platform instance is configurable per tenant;
sending a validation request for the authentication token to the primary authentication application hosting platform instance;
receiving validation confirmation of the authentication token from the primary authentication application hosting platform instance; and
responsive to receiving validation confirmation, granting access to the second application hosted on the second application hosting platform instance to the client, wherein single sign-on is achieved when accessing the second application in a tenant-aware distributed application authentication scenario.

18. The one or more computer-readable media of claim 17 wherein the method further comprises:
recording a timestamp for the request to access the second application hosted on the second application hosting platform instance of the cluster.

19. The one or more computer-readable media of claim 17 wherein the method further comprises:
invalidating the authentication token when a log-on session of the client ends.

20. The one or more computer-readable media of claim 17 wherein the method further comprises:
   invalidating the authentication token after a time out period expires.

\* \* \* \* \*